(12) United States Patent
Katayama

(10) Patent No.: US 10,709,245 B2
(45) Date of Patent: Jul. 14, 2020

(54) ARTICLE FALLING PREVENTION DEVICE

(71) Applicant: WEIGHT TOKAI CO., LTD., Handa-shi, Aichi (JP)

(72) Inventor: Kazuhiro Katayama, Aichi (JP)

(73) Assignee: Weight Tokai Co., Ltd., Aichi (JP)

( * ) Notice: Subject to any disclaimer, the term of this patent is extended or adjusted under 35 U.S.C. 154(b) by 0 days.

(21) Appl. No.: 16/486,027

(22) PCT Filed: Feb. 14, 2018

(86) PCT No.: PCT/JP2018/004955
§ 371 (c)(1),
(2) Date: Aug. 14, 2019

(87) PCT Pub. No.: WO2018/151120
PCT Pub. Date: Aug. 23, 2018

(65) Prior Publication Data
US 2020/0046119 A1   Feb. 13, 2020

(30) Foreign Application Priority Data
Feb. 17, 2017   (JP) .................................. 2017-027761

(51) Int. Cl.
A47B 97/00   (2006.01)
(52) U.S. Cl.
CPC ........ *A47B 97/00* (2013.01); *A47B 2097/008* (2013.01); *B65G 2207/20* (2013.01); *B65G 2207/40* (2013.01)
(58) Field of Classification Search
CPC ... A47B 97/00; A47B 2097/008; A47B 96/00; B65G 2207/40; B65G 2207/20
(Continued)

(56) References Cited

U.S. PATENT DOCUMENTS 5,984,121 A   11/1999   Cole

FOREIGN PATENT DOCUMENTS

| JP | 10-033289 | 2/1998 |
| JP | 11-178665 | 7/1999 |

(Continued)

OTHER PUBLICATIONS

International Search Report issued in International Application No. PCT/JP2018/004955, dated Apr. 24, 2018, 4 pages.

*Primary Examiner* — Andrew M Roersma
(74) *Attorney, Agent, or Firm* — Hamre, Schumann, Mueller & Larson, P.C.

(57) ABSTRACT

Providing a new article falling prevention device capable of preventing an article placed on a mounting plate from falling due to vibration such as an earthquake without using any electrically operating member as a component at all. A left end of a load support member is connected to a left rotating rod 15 pivotally supported rotatably by a left support shaft 13 disposed at a front end side middle portion or a rear end side middle portion, a right end of the load support member is connected to a right rotating rod 16 pivotally supported rotatably by a right support shaft 14 disposed at a front end side middle portion or a rear end side middle portion, and the load support member 17 supports all or part of the load of an article W. In a case where the load support member 17 supports the load of the article W, a falling prevention member 45 moves down or rotates when the left rotating rod 15 and the right rotating rod 16 rotate, the falling prevention member 45 is provided on the front side of the article W when the falling prevention member 45 is most lowered, and when the falling prevention member 45 is most lowered or rotate, an insertion space into which an article lifting unit is inserted from the front side is formed below the falling prevention member 45.

17 Claims, 13 Drawing Sheets

(58) Field of Classification Search
USPC .............. 211/1, 180, 183; 182/112; 108/55.1
See application file for complete search history.

(56) References Cited

FOREIGN PATENT DOCUMENTS

| | | | | |
|---|---|---|---|---|
| JP | 2002154607 A | * | 5/2002 | ............... B65G 1/02 |
| JP | 2010-120750 | | 6/2010 | |
| JP | 2010-273955 | | 12/2010 | |
| JP | 2016-069089 | | 5/2016 | |

* cited by examiner

ARTICLE FALLING PREVENTION DEVICE

TECHNICAL FIELD

The present invention relates to an article falling prevention device that is used to prevent an article such as a product or parts mounted on a mounting plate such as a shelf, rack or cabinet from falling over or falling from the mounting plate due to vibration such as an earthquake.

BACKGROUND ART

As a device for preventing products and the like placed on a mounting plate such as a shelf or rack from falling down due to the occurrence of an earthquake etc., for example, a device disclosed in JP 2010-273955 A (Patent Literature 1) (housing article fall prevention unit) has been proposed. In the housing article fall prevention unit disclosed in Patent Literature 1, a fall prevention arm is lowered from a standby state by driving an actuator that operates in response to a signal from a seismometer that detects vibrations due to earthquakes.

Therefore, according to the housing article fall prevention unit disclosed in Patent Literature 1, a housing article does not fall down by coming into contact with the fall prevention arm that has lowered due to the occurrence of an earthquake.

CITATION LIST

Patent Literature

Patent Literature 1: JP 2010-273955 A

SUMMARY OF INVENTION

Technical Problem

However, according to Patent Literature 1, since a seismometer and an actuator are components, these operate electrically, and therefore a power source is necessarily required, in addition, these do not operate in the case of a power failure due to an earthquake.

Therefore, the present invention is proposed to solve the problems of the above-described conventional techniques, and an object of the present invention is to provide a new article falling prevention device capable of preventing an article from falling due to vibration such as an earthquake without using an electrically operating member as a component at all.

Solution to Problem

The present invention is proposed to solve the above issue, and the first invention (invention according to claim 1) is characterized in that an article falling prevention device, formed with an article housing space in which the front side is open, and an article is stored inside, the article falling prevention device, comprises a left rotating rod rotatably disposed about a left support shaft having a length in the horizontal direction, a right rotating rod rotatably disposed about a right support shaft having a length in the horizontal direction, a load support member of which left end is connected to a front end side or a rear end side of the left rotating rod and of which right end is connected to a front end side or a rear end side of the right rotating rod, to support all or a part of a load of the article, an elastic member in which a front end side or a rear end side of the load support member or a front end side or a rear end side of the left rotating rod or the right rotating rod is energized so as to be always positioned upward, and a falling prevention member configured to stand by at a standby position above or diagonally above the load support member in a standby state before an article is placed on the load support member and move from the standby position to the front side of the article in a fall prevention state after the article is placed on the load support member. The left support shaft pivotally supports the left rotating rod on either the front end side or the rear end side of the left rotating rod, the right support shaft pivotally supports the right rotating rod at either the front end side or the rear end side of the right rotating rod, the left end of the falling prevention member and the left rotating rod are mutually connected by a linear connecting member consisting of a linear body, link connecting member consisting of a single or a plurality of link members, or a composite connecting member consisting of the linear body and a plurality of link members, further, the right end of the falling prevention member and the right rotating rod are mutually connected by a linear connecting member consisting of a linear body, a link connecting member consisting of a single or a plurality of link members, or a composite connecting member consisting of the linear body and a plurality of link members, and when the falling prevention member is in the fall prevention state, an insertion space into which a fork of a forklift and other machines, which lifts an article from on the load support member, or an article lifting unit included in the device is inserted from the front side is formed below the falling prevention member.

The article falling prevention device according to the first aspect of the present invention has an article housing space which is open in the front side and store an article inside. The member forming this housing space may be a member provided with a left side plate or a right side plate (refer to the invention according to claim 2), and may have a left frame or a right frame (refer to the invention according to claim 8). In the first invention of the present invention, a left rotating rod and a right rotating rod are provided. The left rotating rod and the right rotating rod are rotatable about a left support shaft or a right support shaft having a length in the horizontal direction. Then, the left support shaft pivotally supports the left rotating rod on either the front end side or the rear end side of the left rotating rod, and the right support shaft pivotally supports the right rotating rod at either the front end side or the rear end side of the right rotating rod.

Further, in the present invention, the load support member is a component, and the load support member has a left end connected to the left rotating rod and a right end connected to the right rotating rod and supports all or part of the load of the article. Therefore, in the case where the left support shaft pivotally supports the left rotating rod on the front end side of the left rotating rod, the right support shaft pivotally supports the right rotating rod at the front end side of the right rotating rod, also the left end of the load support member is connected to the front end side of the left rotating rod, and the right end of the load support member is connected to the front end side of the right rotating rod, when the load of an article is supported by the load support member, by the principle of leverage, the rear ends of the left and right rotating rods move up more than the lengths by which the respective front ends of the left and right rotating rods are lowered. On the other hand, in the case where the left support shaft pivotally supports the left rotating rod on the rear end side of the left rotating rod, the right support shaft pivotally supports the right rotating rod at the rear end side of the right rotating rod, also the left end of the load support member is connected to the rear end side of the left rotating rod, and the right end of the load support member is connected to the rear end side of the right rotating rod, when the load of an article is supported by the load support member, by the principle of leverage, the front ends of the left and right rotating rods move up more than the lengths by which the respective front ends of the left and right rotating rods are lowered. In addition, this load support member may be just support at least a part of the load of an article, and the shape and area are not specifically limited. For example, most of the load of the article may be supported by the bottom plate, and a part of the load may be a horizontally disposed bar so as to be supported by the load support member, or may be formed of a plate body on which the entire article is placed.

Further, in the present invention, an elastic member is a component. The elastic member may be energized such that the front end side or the rear end side of the load support member is always positioned upward, and the elastic member may be energized such that the front end side or the rear end side of the left rotating rod or the right rotating is always positioned upward. Now that, in the case where the elastic member energizes the front end side or the rear end side of the left rotating rod or the right rotating rod to be always positioned upward, the elastic member for energizing the left rotating rod and the elastic member for energizing the right rotating rod may be separately disposed. In addition, since this (these) elastic member energizes such that the front end side or the rear end side of the load support member or the left rotating rod or the right rotating rod is always positioned upward, the elastic member is not only disposed below the load support member or the left rotating rod or the right rotating rod, but may be disposed above them. In addition, the shape of the elastic member may be a wound spring or a plate spring.

Further, in the present invention, the falling prevention member is a component. In a standby state before an article is placed on the load support member, the falling prevention member stands by at a standby position above or diagonally above the load support member, and the falling prevention member moves from the standby position to the front side of the article in the fall prevention state after the article is placed on the load support member. The left end of the falling prevention member and the left rotating rod are mutually connected by a linear connecting member consisting of linear bodies, a link connecting member consisting of a single or a plurality of link members, or a composite connecting member consisting of the above linear body and a plurality of link members. Further, the right end of the falling prevention member and the right rotating rod are mutually connected by a linear connecting member consisting of a linear body, or a link connecting member comprising a single or a plurality of link members, or a composite connecting member consisting of the linear body and a plurality of link members. Therefore, in the present invention, when an article is placed on the load support member, the falling prevention member moves from the standby state to the fall prevention state, through the linear connecting member, the link connecting member, or the composite connecting member. Furthermore, in the present invention, an insertion space is formed below the falling prevention member. When the falling prevention member is in the fall prevention state, a fork of a forklift or other machine or an article lifting unit included in the device is inserted from the front side of the insertion hole.

Therefore, according to the article falling prevention device according to the configuration described above, when all or part of the load of an article is supported by the article support member by the above-described load lifting unit, the left rotating rod rotates about the left support shaft, and the right rotating rod rotates about the right support shaft, by the load of the article against an elastic force of the elastic member. As a result, the rear end side or the front end side of the left rotating rod and the right rotating rod moves up over a distance longer than the distance the load support member is lowered. Through the rotation of the left rotating rod and the right rotating rod, and the operation of the linear connecting member, the link connecting member, or the composite connecting member, the falling prevention member in the standby state becomes the fall prevention state. Then, since the insertion space is formed under the falling prevention member which is in the fall prevention state in this way, the article lifting unit is moved to the outside with the article left. In this state, when the article is tilted in the direction of falling due to vibration such as an earthquake, the article comes into contact on the falling prevention member to prevent from falling. On the other hand, in the case of removing the article from the load support plate, when the article lifting unit is inserted into the insertion space from the outside and lifted from the load support member, the load support member, the left rotating rod, the right rotating rod, and the falling prevention member each return to the original state (standby state) by the elastic force of the elastic member.

That is, in the article falling prevention device according to the first invention of the present invention, it is possible to prevent an article whose load is supported by a load support member from falling due to vibration such as an earthquake, only by using a mechanical configuration without using any electrically operating member as a component at all, and even in the event of a power failure due to the occurrence of an earthquake or the like, it is possible to reliably prevent the article from falling.

Further, the second invention (invention according to claim 2) is characterized in that, in the first invention, the article housing space is formed with a bottom plate, a left side plate erected on the left side of the bottom plate, and a right side plate erected on the right side of the bottom plate and facing the left side plate, the load support member is disposed above the bottom plate, and when the load support member is lowered against an elastic force of the elastic member due to the load of the article, the load support member comes into contact with the upper surface of the bottom plate.

Therefore, in the case of the article falling prevention device according to the second invention of the present invention, it is possible to prevent an article whose load is supported by a load support member from falling due to vibration such as an earthquake, only by using a mechanical configuration without using any electrically operating member as a component at all, and even in the event of a power failure due to the occurrence of an earthquake or the like, it is possible to reliably prevent the article from falling, and also when the article is placed on the load support member, and the load support member is lowered, the load support member comes into contact with the upper surface of the bottom plate, and therefore the mounting portion can be mounted in a more stable state.

Further, the third invention (claim 3) of the present invention is characterized in that, in the second invention, the falling prevention member is positioned on the upper end side of the front end side of the left side plate and the right side plate in the standby state, the falling prevention member is positioned at the middle portion on the front end side of the left side plate and the right side plate and positioned on the front side of the article in the fall prevention state, a position holding unit configured to hold a position of the falling prevention member in a case where the article is in contact with the back surface of the falling prevention member is disposed on the front surfaces of the left side plate and the right side plate, the left end of the falling prevention member and the left rotating rod are connected by a linear body forming the linear connecting member or connected to an end of a linear body forming the composite connecting member, further, the right end of the falling prevention member and the right rotating rod are connected by a linear body forming the linear connecting member or connected to an end of a linear body forming the composite connecting member, when an article is placed on the load support member, the left rotating rod rotates about the left support shaft, the right rotating rod rotates about the right support shaft, and through the operation of the linear connecting member or the composite connecting member, the falling prevention member is lowered to reach the fall prevention state.

In the third invention of the present invention, the right and left ends of the falling prevention member are suspended by the linear body, and the falling prevention member is lowered when an article is placed on the load support member to reach to the fall prevention state. When the article is removed from the load support member, the falling prevention member moves up to reach a standby state. That is, in the third invention of the present invention, the falling prevention member is movable up and down, and when the falling prevention member is lowered to reach the fall prevention state, in the case where an article falls and comes into contact with the falling prevention member when an earthquake or the like occurs and, the position holding unit holds the position of the falling prevention member. Now that, as the position holding unit, for example, a left guide plate is provided on the front side of the left side plate so as to face the front side, the inside of the left guide plate is provided as a left guide space, further, a right guide plate facing the front side is provided on the front side of the right side plate, the inside of the right guide plate is provided as a right guide space, the left end side of the falling prevention member is disposed in the left guide space, and the right end side of the falling prevention member is disposed in the right guide space. When the article comes into contact with the falling prevention member, the left end side of the falling prevention member comes into contact with the back surface of the left guide plate, and the right end side of the falling prevention member comes into contact with the back surface of the right guide plate, and by adopting such configuration, the falling prevention member may hold its position.

Further, the fourth invention (invention according to claim 4) of the present invention is characterized in that, in any of the first to third inventions, the left end of the falling prevention member and the left rotating rod are connected to each other by the composite connecting member, further, the right end of the falling prevention member and the right rotating rod are connected to each other by the composite connecting member, one end of a first left link member included in the composite connecting member is rotatably connected to a rear end of the left rotating rod, one end of a second left link member included in the composite connecting member is rotatably connected to the other end of the first left link member, one end of a left linear body included in the composite connecting member and of which a middle portion is guided by a linear body guide member is fixed to the other end of the second left link member, the other end of the left linear body is fixed to the left end of the falling prevention member, one end of a first right link member included in the composite connecting member is rotatably connected to a rear end of the right rotating rod, one end of the second right link member included in the composite connecting member is rotatably connected to the other end of the first right link member, one end of a right linear body included in the composite connecting member and of which a middle portion is guided by a linear body guide member is fixed to the other end of the second right link member, the other end of the right linear body is fixed to the right end of the falling prevention member, when an article is placed on the load support member, the left rotating rod rotates about the left support shaft, the right rotating rod rotates about the right support shaft, and through the operation of the composite connecting member, the falling prevention member is lowered to reach the fall prevention state.

The article falling prevention device according to the fourth invention of the present invention is a device in which the left rotating rod or the right rotating rod and the falling prevention member are connected by the composite connecting member, and as a link member forming the composite connecting member, the first and second left link member and the first and second right link member are components. By using such the composite connecting member as a component, an elevating range of the falling prevention member which can move up and down from the standby state to the fall prevention state can be made long.

Further, the fifth invention (invention according to claim 5) of the present invention is characterized in that, in any of the second to fourth inventions, a left projecting portion projecting in the left side plate direction is formed at a rear end or a rear end side middle portion of the left rotating rod, the left side plate is formed with a left guide groove corresponding to a movement locus along which the left projecting portion is inserted and moves, a right projecting portion projecting in the right side plate direction is formed at a rear end or a rear end side middle portion of the right rotating rod, the right side plate is formed with a right guide groove corresponding to a movement locus along which the right projecting portion is inserted and moves, and the left rotating rod rotates while being guided by the left guide groove, and the right rotating rod rotates while being guided by the right guide groove.

According to the article falling prevention device according to the fifth invention of the present invention, the left rotating rod rotates while being guided by the left guide groove via the left projecting portion, the right rotating rod rotates while being guided by the right guide groove via the right projecting portion, rotation of the left rotating rod and the right rotating rod accompanying supporting a load of the article by the load support member and removing the article from the load support member can be made smooth. As a result, the falling prevention member can be moved up and down smoothly.

Now that, as described above, both of the left rotating rod and the right rotating rod according to the present invention may be disposed not only on the outer side of the left side plate or the right side plate but also on the inner side. Therefore, the left protruding portion is not only inserted inward from the outside of the left side plate, but when the left rotating rod is disposed inside the left side plate, the rotating rods may be inserted outward from the inner side of the left side plate. Similarly, the right protruding portion is not only inserted from the outside of the right side plate inward but also inserted from the inside of the right side plate outward when the right rotating rod is disposed inside the right side plate.

Further, the sixth invention (invention according to claim 6) of the present invention is characterized in that, in the fourth invention, in the article falling prevention device according to claim 4, left link side protruding portions protruding in the left side plate direction is formed at ends and/or middle portions of the first and second left link members, the left side plate is formed with a left link side guide groove corresponding to a movement locus along which the left link side protruding portion moves, a right link side protruding portion protruding in the right side plate direction is formed at ends and/or middle portions of the first and second right link members, the right side plate is formed with a right link side guide groove corresponding to a movement locus along which the right link side protruding portion moves, the first and second left link members rotate while being guided by the left link side guide groove, and the first and second right link members rotate while being guided by the right link side guide groove.

According to the article falling prevention device according to the sixth invention of the present invention, the first and second left link members rotate while being guided by the left link side guide groove, and the first and second right link members are guided by the right link side guide groove. Therefore, the rotation of the first and second left link members and the first and second right link members accompanying supported the load of the article by the load support member and lifting the article from the load support member can be made smooth. As a result, the falling prevention member can be operated smoothly.

Further, the seventh invention (invention according to claim 7) of the present invention is characterized in that, in any of the second to sixth inventions, the load support member is molded in a plate shape, a left end of the load support member and a front end side or a rear end side of the left rotating rod are rotatably connected to each other by a left rotating shaft, a right end of the load support member and a front end side or a rear end side of the right rotating rod are rotatably connected to each other by a right rotating shaft, when all or part of a load of an article is supported by the load support member, a lower surface of the load support member comes into contact with an upper surface of the bottom plate.

In the article falling prevention device according to the seventh invention of the present invention, the load support member is molded in a plate shape and supports all or part of the load of the article as described above. In the fourth invention of the present invention, the left end of the load support member and the front end side or the rear end side of the left rotating rod are rotatably connected to each other by the left rotating shaft, and the right end of the load support member and the front end side or the rear end side of the right rotating rod are rotatably connected to each other by the right rotating shaft. Therefore, according to the article falling prevention device formed as described above, when all or part of the load of the article is supported by the load support member and moves down against the elastic force of the elastic member, since the left rotating rod and the right rotating rod rotate about the left rotating shaft or the right rotating shaft, while the load support member rotates about the left rotating shaft and the right rotating shaft, the posture of the load support member is not affected by the rotation of the left and right rotating rods, the article is supported on the upper surface of the load support member, and the lower surface of the load support member comes into contact with the upper surface of the bottom plate without being inclined with respect to the upper surface of the bottom plate positioned below the load support member which is a plate body. As a result, the article can be supported in a more stable state.

Further, the eighth invention (invention according to claim 8) of the present invention is characterized in that, in the first invention, the article housing space is surrounded by a left frame molded in a square shape, a right frame molded in a square shape, and a plurality of horizontal rods connecting the left frame and the right frame, the load support member is formed into a plate shape, a front end side or a rear end side of a left end of the load support member and a front end side or a rear end side of the left rotating rod are rotatably connected with each other by one left rotating shaft, a rear end side or a front end side of a left end of the load support member and the left frame are rotatably connected by the other left rotating shaft, a front end side or a rear end side of a right end of the load support member and a front end side or a rear end side of the right rotating rod are rotatably connected with each other by one right rotating shaft, and a rear end side or a front end side of a right end of the load support member and the right frame are rotatably connected by the other right rotating shaft.

In the article falling prevention member according to the eighth invention of the present invention, the rear end side or the front end side of the left end of the load support member molded in a plate shape and the left frame can be rotatably connected by the other left rotating shaft. The rear end side or front end side of the right end of the load support member and the right frame are rotatably connected by the other right rotating shaft. Therefore, the load support member is rotatable about the other left rotating shaft and the other right rotating shaft, which are respectively fixed. Further, the front end side or the rear end side of the left end of the load support member and the front end side or the rear end side of the left rotating rod are rotatably connected with each other by one left rotating shaft, and the front end side or rear end side of the right end of the load support member and the front end side or rear end side of the right rotating rod are rotatably connected to each other by one right rotating shaft. Therefore, when the load of the article acts on the load support member according to such a configuration, the load support member rotates with the other left rotating shaft and the other right rotating shaft as rotation centers, the front end side or the rear end side of the left rotating rod and the front end side or the rear end side of the right rotating rod move downward. Along with this movement of the load support member, through the operation of the linear connection member, link connection member, or composite connection member, the falling prevention member moves from the standby state to the fall prevention state.

Therefore, according to the article falling prevention member according to the eighth invention of the present invention, there is no need to include the left side plate and the right side plate, and further the bottom plate, to operate the falling prevention member.

Further, the ninth invention (invention according to claim 9) of the present invention is characterized in that, in the eighth invention, a left end of the falling prevention member and the left rotating rod are connected via the link connecting member, a right end of the falling prevention member and the right rotating rod are connected via the link connecting member, when an article is placed on the load support member, the left rotating rod rotates about the left support shaft, the right rotating rod rotates about the right support shaft, and the falling prevention member draws an arc from the upper end side of the left frame and the right frame to the front side of the article through the operation of the link connecting member to reach the fall prevention state.

The article falling prevention member according to the ninth invention of the present invention does not use a linear body as in the invention described above. Further, the falling prevention member draws an arc from the upper end side of the left frame and the right frame to the front side of the article to reach the fall prevention state. Therefore, it is possible to effectively prevent that the linear body is cut by being used for a long time and prevent the falling prevention member from being moved downward without holding the horizontal state.

Further, the tenth invention (invention according to claim 10) of the present invention is characterized in that, in the eighth or ninth invention of the present invention, the falling prevention member comprises a plate-like falling prevention member main body positioned in front of an article in the fall prevention state, a left arm of which front end is fixed to a left side of the back surface of the fall prevention main body, and rear end is extended to a rear side of the falling prevention member main body, the left arm being rotatably connected to the link member, and a right arm of which front end is fixed to a right side of the back surface of the falling prevention member main body, and rear end is extended to a rear side of the falling prevention member main body, the right arm being rotatably connected to the link member, a left contact member is fixed to the left arm, a right contact member is fixed to the right arm, a left stopper having a length in the horizontal direction and with which the left contact member is in contact is fixed in the fall prevention state to the inside of the left frame, and a right stopper having a length in the horizontal direction and with which the right contact member is in contact is fixed in the fall prevention state to the inside of the right frame.

In the article falling prevention device according to the tenth invention of the present invention, when the falling prevention member reaches a fall prevention state from the standby state, the left contact member comes into contact with the left stopper, and the right contact member comes into contact with the right stopper. Therefore, according to the article falling prevention device according to the tenth invention of the present invention, even when an external force acts downward on the falling prevention member, it is possible to stably maintain each state (fall prevention state) and to effectively prevent the link member, the left rotating rod or the right rotating rod from being damaged or adversely affecting the connection state thereof.

Advantageous Effects of Invention

According to the present invention, it is possible to prevent an article supported on a load receiving member by a load from falling due to vibration such as an earthquake only by using a mechanical configuration without using an electrically operating member as a component at all.

In particular, according to the article falling prevention device, according to the fifth invention (invention according to claim 5) and the sixth invention (invention according to claim 6) of the present invention, the rotation of each link member accompanying supported the load of the article by the load support member and lifting the article from the load support member can be made smooth. As a result, the falling prevention member can be operated smoothly.

Furthermore, according to the article falling prevention device according to the seventh invention (invention according to claim 7) and the eighth aspect (invention according to claim 8) of the present invention, it is further possible to support the article in a stable state and prevent inadvertent fall due to vibration such as an earthquake.

Further, the article falling prevention member according to the ninth invention of the present invention (invention according to claim 9) does not use a linear body as in the invention described above, and the falling prevention member draws an arc from the upper end side of the left frame and the right frame to the front side of the article to reach the fall prevention state. Therefore, according the ninth invention of the present invention, it is possible to effectively prevent that the linear body is cut by being used for a long time and prevent the falling prevention member from being moved downward without holding the horizontal state.

Further, according to the article falling prevention device according to the tenth invention of the present invention (invention according to claim 10), even when an external force acts downward on the falling prevention member, it is possible to stably maintain each state (fall prevention state) and to effectively prevent the link member, the left rotating rod or the right rotating rod from being damaged or adversely affecting the connection state thereof.

DESCRIPTION OF EMBODIMENTS

Hereinafter, a falling prevention device (hereinafter referred to as a falling prevention device) according to the preferable embodiments of the present invention will be described in detail with reference to the drawings.

Figure 1:
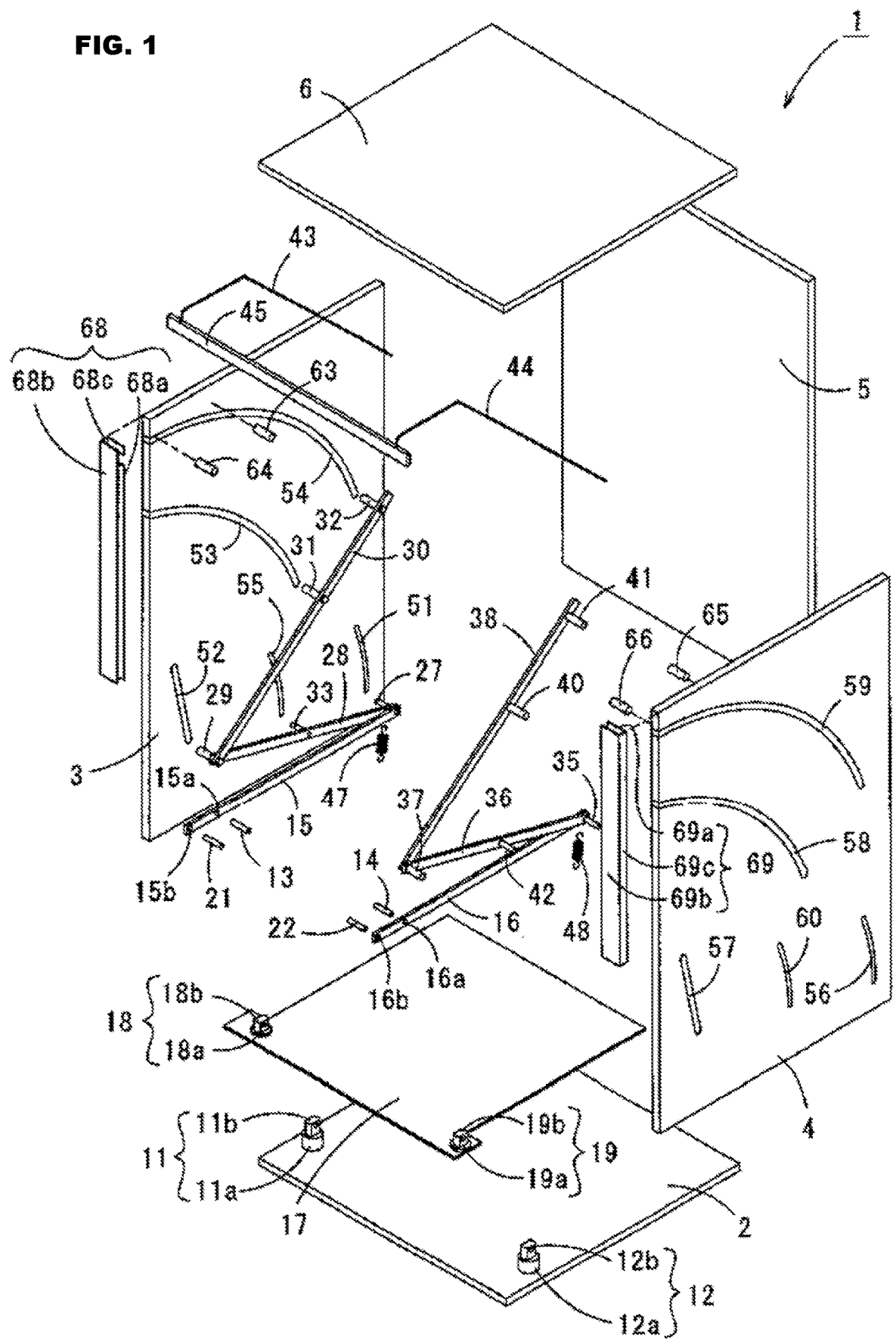
FIG. 1 is an exploded perspective view illustrating an article falling prevention device according to a first embodiment of the present invention.

As illustrated in FIG. 1, the falling prevention device 1 according to the present embodiment (the first embodiment) includes: a bottom plate 2 molded in a square shape; a left side plate 3 erected from the left end of the bottom plate 2; a right side plate 4 erected from the right end of the bottom plate 2; a back side plate 5 erected from the back side end of the bottom plate 2, connected to the back side end of the left side plate 3 at the left end, and connected to the back side end of the right side plate 4 at the right end; and a top plate 6 facing the bottom plate 2. In the falling prevention device 1 according to the present embodiment, the left side plate 3, the right side plate 4, the back side plate 5 and the top plate 6 are all made of a metal plate molded in a square shape.

Figure 2:
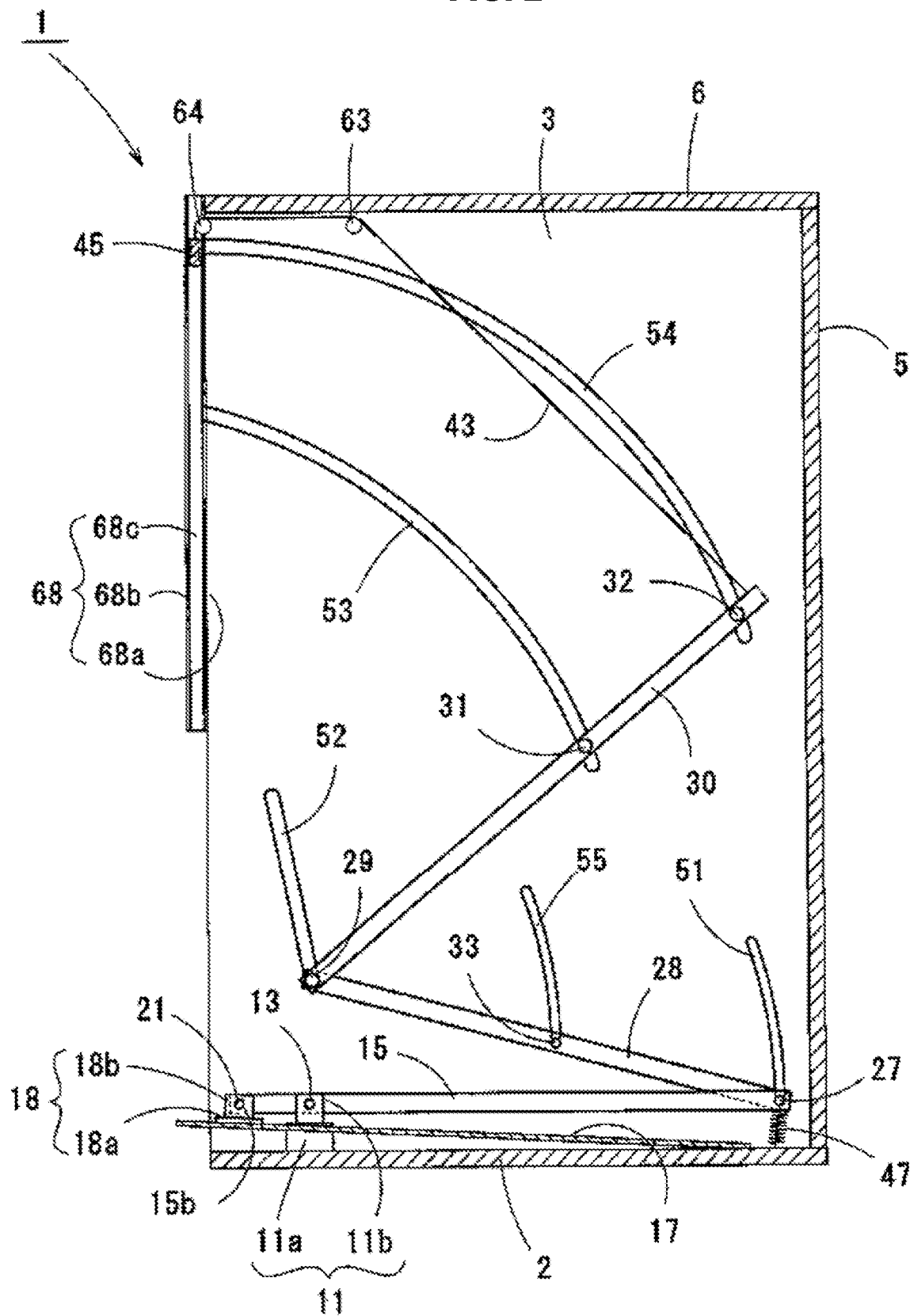
FIG. 2 is a right side cross-sectional view of the article falling prevention device, indicating a state in which a falling prevention member is lifted.
Figure 3:
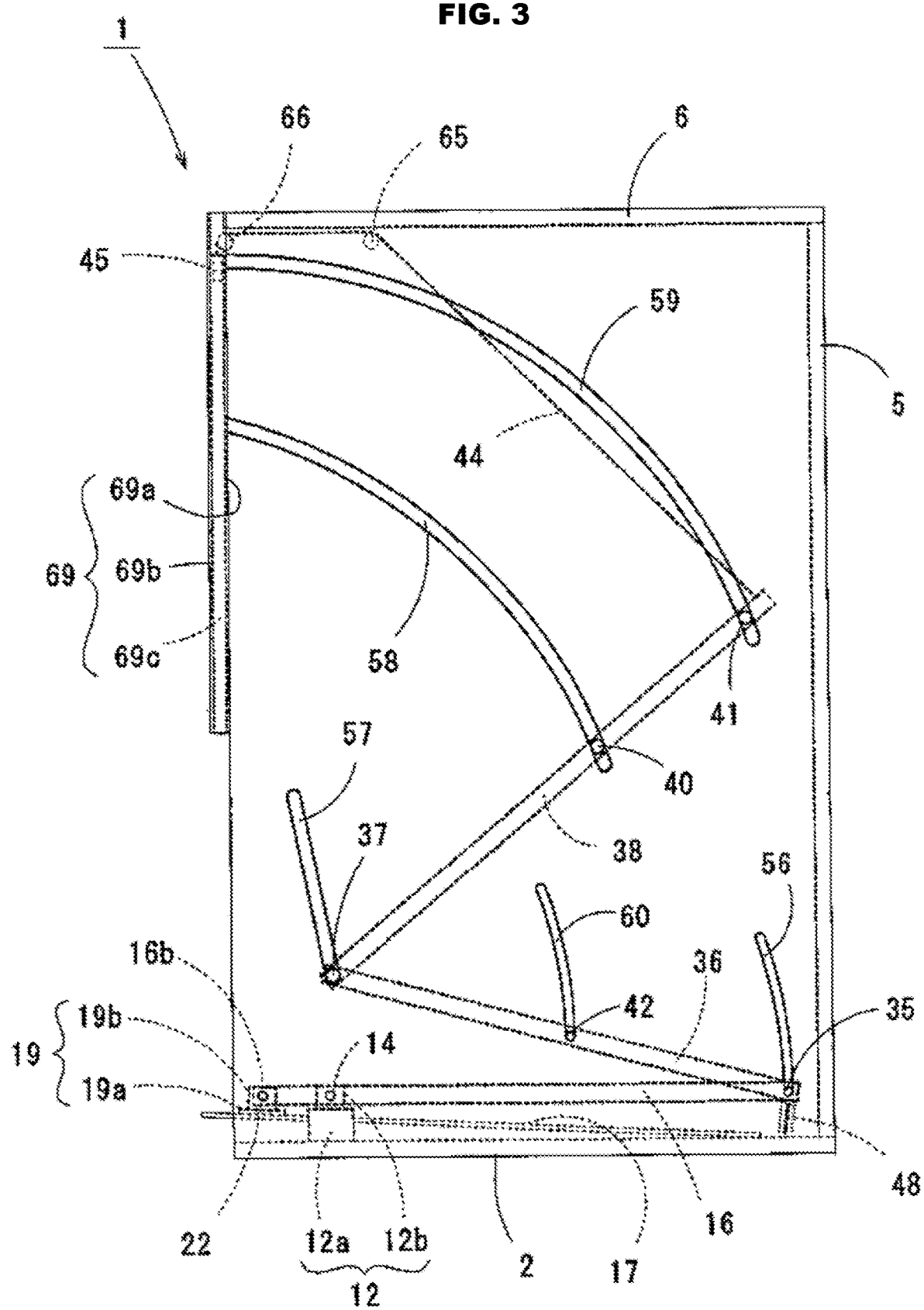
FIG. 3 is a right side view of the article falling prevention device.

Then, as illustrated in FIG. 1 or 2, the first left support shaft holding member 11 is fixed to the left front middle portion of the bottom plate 2, and as illustrated in FIG. 1 or 3, the first right support shaft holding member 12 is fixed to the right front side middle portion of the bottom plate 2. The first left support shaft holding member 11 and the first right support shaft holding member 12 each include base portions 11a and 12a fixed to the upper surface of the bottom plate 2 and support shaft holding portions 11b and 12b which are formed on the upper portions of the base portions 11a and 12a and in which shaft insertion holes (reference numerals are omitted) are formed in the horizontal direction. The left support shaft 13 is inserted into the support shaft holding portion 11b of the first left support shaft holding member 11. The right support shaft 14 is inserted through the support shaft holding portion 12b of the first right support shaft holding member 12. A left rotating rod 15 is attached to the left support shaft 13. The left rotating rod 15 has a length from the front side to the back side of the falling prevention device 1. A first left insertion hole 15a through which the left support shaft 13 is inserted is formed in the front side middle portion, a second left insertion hole 15b is formed on the front side (front end side) further than the position where the first left insertion hole 15a is formed. Further, a right rotating rod 16 is attached to the right support shaft 14. The right rotating rod 16 is molded in the same shape as the left rotating rod 15, the front side middle portion is formed with a first right insertion hole 16a through which the right support shaft 14 is inserted, and a second right insertion hole 16b is formed on the front side (front end side) further than the position where the first right insertion hole 16a is formed. That is, the left rotating rod 15 is pivotally supported rotatably with the left support shaft 13 (supporting point) as a rotation center, the right rotating rod 16 is rotatably supported with the right support shaft 14 (supporting point) as a rotation center. As described later, when a load acts on the front end (power point) of the left rotating rod 15, the back side end (rear end) of the left rotating rod 15 moves up a distance longer than the distance the front side end (front end) moves downward. In addition, when a load acts on the front end (power point) of the right rotating rod 16, the back side end (rear end) of the right rotating rod 16 moves up over a distance longer than the distance the front side end (front end) moves downward.

Further, on the bottom plate 2, a load support member 17 for supporting a load of an article is disposed. The load support member 17 is molded to have a length and a width slightly narrower than the length and the width of the bottom plate 2, and in the falling prevention device 1 according to the present embodiment, the front side end is protruding slightly to the front of the front side end (front end) of the bottom plate 2 as illustrated in FIG. 2 or 3. Further, the back side end (rear end) of the load support member 17 is supported and in contact with the bottom plate 2. Then, as illustrated in FIG. 1, a second left support shaft holding member 18 is attached to the front side left end of the load support member 17, and the second right support holding member 19 is fixed to the right side of the front side. The second left support shaft holding member 18 and the second right support shaft holding member 19 each include base portions 18a and 19a fixed to a lower surface of the bottom plate 2 and support shaft holding portions 18b and 19b which are formed above the base portions 18a and 19a and in which shaft insertion holes (reference numerals are omitted) are formed in the horizontal direction. A left rotating shaft 21 is inserted into the support shaft holding portion 18b of the second left support shaft holding member 18. Further, a right rotating shaft 22 is inserted through the support shaft holding portion 19b of the second right support shaft holding member 19.

Then, the left rotating shaft 21 is inserted into the second left insertion hole 15b formed in the left rotating rod 15, as illustrated in FIG. 2. Further, as illustrated in FIG. 3, the right rotating shaft 22 is inserted into the second right insertion hole 16b formed in the right rotating rod 16. That is, the left side on the front side of the load support member 17 is rotatably supported and connected via a left rotating shaft 21. Further, the right side on the front side of the load support member 17 is rotatably supported and connected via the right rotating shaft 22. Therefore, as described later, when a load is placed on the load support member 17, the load support member 17 moves downward while rotating about the left rotating shaft 21 and the right rotating shaft 22, and the lower surface of the load support member 17 come into contact with the upper surface of the bottom plate 2.

Further, as illustrated in FIG. 1 or 2, one end of a first left link member 28 is rotatably connected to the rear end of the left rotating rod 15 about the first left link side protruding portion 27 via the first left link side protruding portion 27. Further, one end of the second left link member 30 is rotatably connected to the other end of the first left link member 28 about the second left link side protruding portion 29 via the second left link side protruding portion 29. Then, a third left link side protruding portion 31 is formed in the middle portion on the other end side of the second left link member 30 and a fourth left side protruding portion 32 is formed at the other end of the second left link member 30. Now that, in the falling prevention device 1 according to the present embodiment, a fifth left link side protruding portion 33 is further formed at the middle portion of the first left link member 28. Then, the first to fifth left link side protruding portions 27, 29, 31, 32, and 33 each have a length in the thickness direction of the left side plate 3.

Further, as illustrated in FIG. 1 or 3, one end of a first right link member 36 is rotatably connected to the rear end of the right rotating rod 16 about the first right link side protruding portion 35 via the first right link side protruding portion 35. Further, one end of the second right link member 38 is rotatably connected to the other end of the first right link member 36 about the second right link side protruding portion 37 via the second right link side protruding portion 37. Then, a third right link side protruding portion 40 is formed in the middle portion on the other end side of the second right link member 38, and a fourth right side protruding portion 41 is formed at the other end of the second right link member 38. Now that, in the falling prevention device 1 according to the present embodiment, a fifth right link side protruding portion 42 is further formed in the middle portion of the first right link member 36. Each of the first to fifth right link side protruding portions 35, 37, 40, 41, and 42 has a length in the thickness direction of the right side plate 4.

Figure 5:
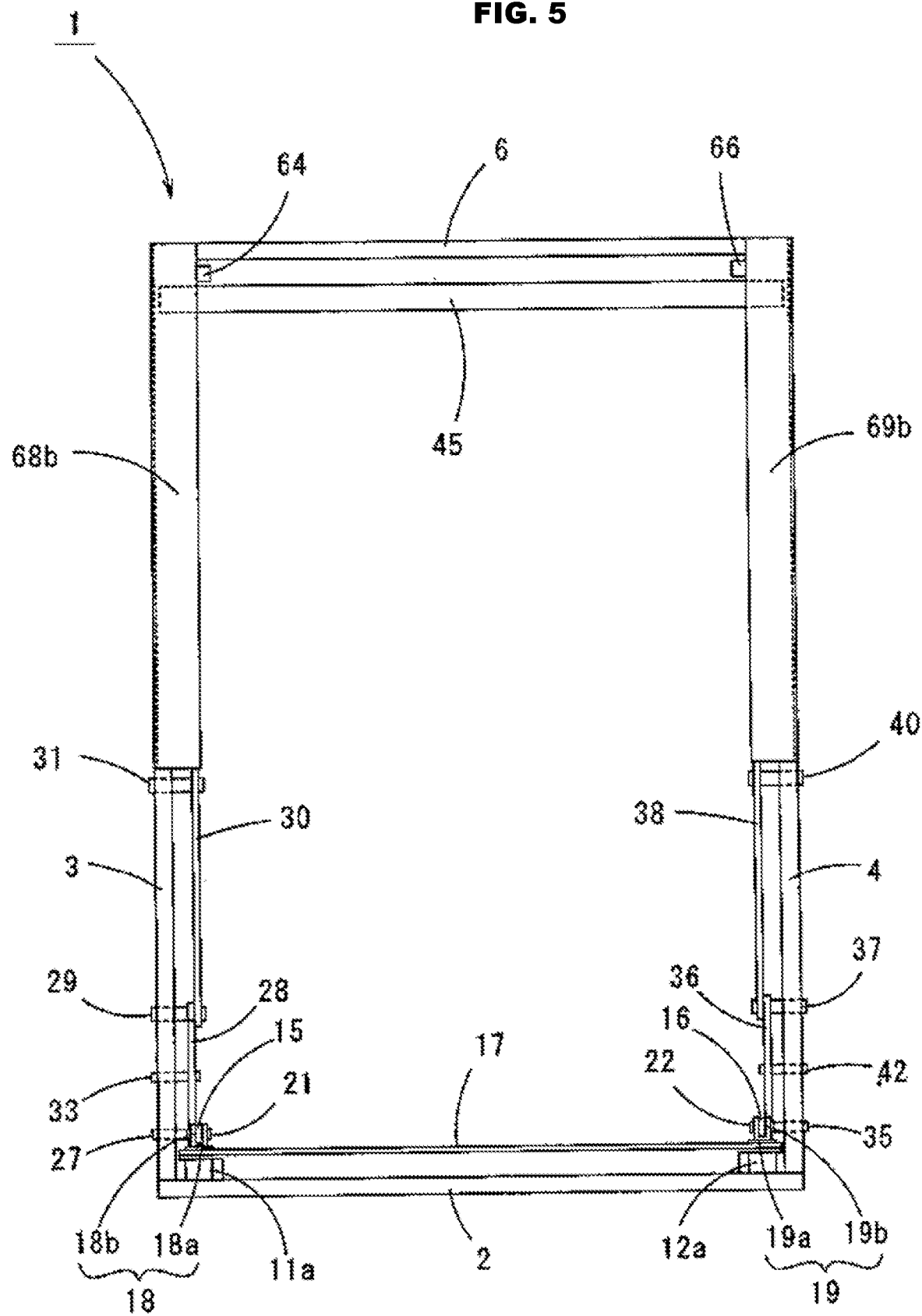
FIG. 5 is a front view of the article falling prevention device, indicating a state in which the falling prevention member is lifted.

Then, as illustrated in FIG. 2, one end of the left linear body 43 is connected to the other end of the second left link member 30, and the other end of the second right link member 38 is connected to one end of the right linear body 44 as illustrated in FIG. 3. The left linear body 43 and the right linear body 44 are formed of flexible linear bodies such as chains or wires, and the other ends of the left linear body 43 and the right linear body 44 are fixed to the left end side and the right end side of the falling prevention member 45 which moves up and down on the front side of the left side plate 3 and the right side plate 4. The falling prevention member 45 is a rod-like body having a length in the horizontal direction, as illustrated in FIG. 1 or 5.

Then, the lower end of the left elastic member 47 is fixed to the left rear end side of the bottom plate 2 as illustrated in FIG. 2, and the upper end of the left elastic member 47 is engaged at the rear end of the left rotating rod 15. Further, as illustrated in FIG. 3, the lower end of the right elastic member 48 is fixed to the right rear end side of the bottom plate 2, and the upper end of the right elastic member 48 is engaged at the rear end of the right rotating rod 16. In the falling prevention device 1 according to the present embodiment, the left elastic member 47 and the right elastic member 48 are configured by a (pulled) coil spring, and the rear end side of the left rotating rod 15 or the right rotating rod 16 is energized downward (in the direction of the bottom plate 2).

Further, the first to fifth left link side protruding portions 27, 29, 31, 32, and 33 are inserted into the left side plate 3, and the first to fifth left guide grooves 51 to 55 corresponding to the movement loci of the first left link member 28 and the second left link member 30 are formed in an arc shape. Further, the first to fifth right link side protruding portions 35, 37, 40, 41, and 42 are inserted into the right side plate 4, and the first to fifth right guide grooves 56 to 60 corresponding to the movement loci of the first right link member 36 and the second right link member 38 are formed in an arc shape.

At the upper end side of the inner side surface of the left side plate 3, as illustrated in FIG. 1 or 2, a first left linear body guide member 63 and a second left linear body guide member 64 each for supporting and guiding the middle portion of the left linear body 43 are disposed. Further, on the upper end side of the inner surface of the right side plate 4, as illustrated in FIG. 1 or 3, a first right linear body guide member 65 and a second right linear body guide member 66 each for guiding the middle portion of the right linear body 44 are disposed. The first left linear body guide member 63 and the first right linear body guide member 65 are disposed slightly behind the front surface (front end) of the left side plate 3 and the right side plate 4 respectively, and the second left linear body guide member 64 and the second right linear body guide member 66 are disposed in the front vicinity of the left side plate 3 and the right side plate 4 respectively.

Figure 6:
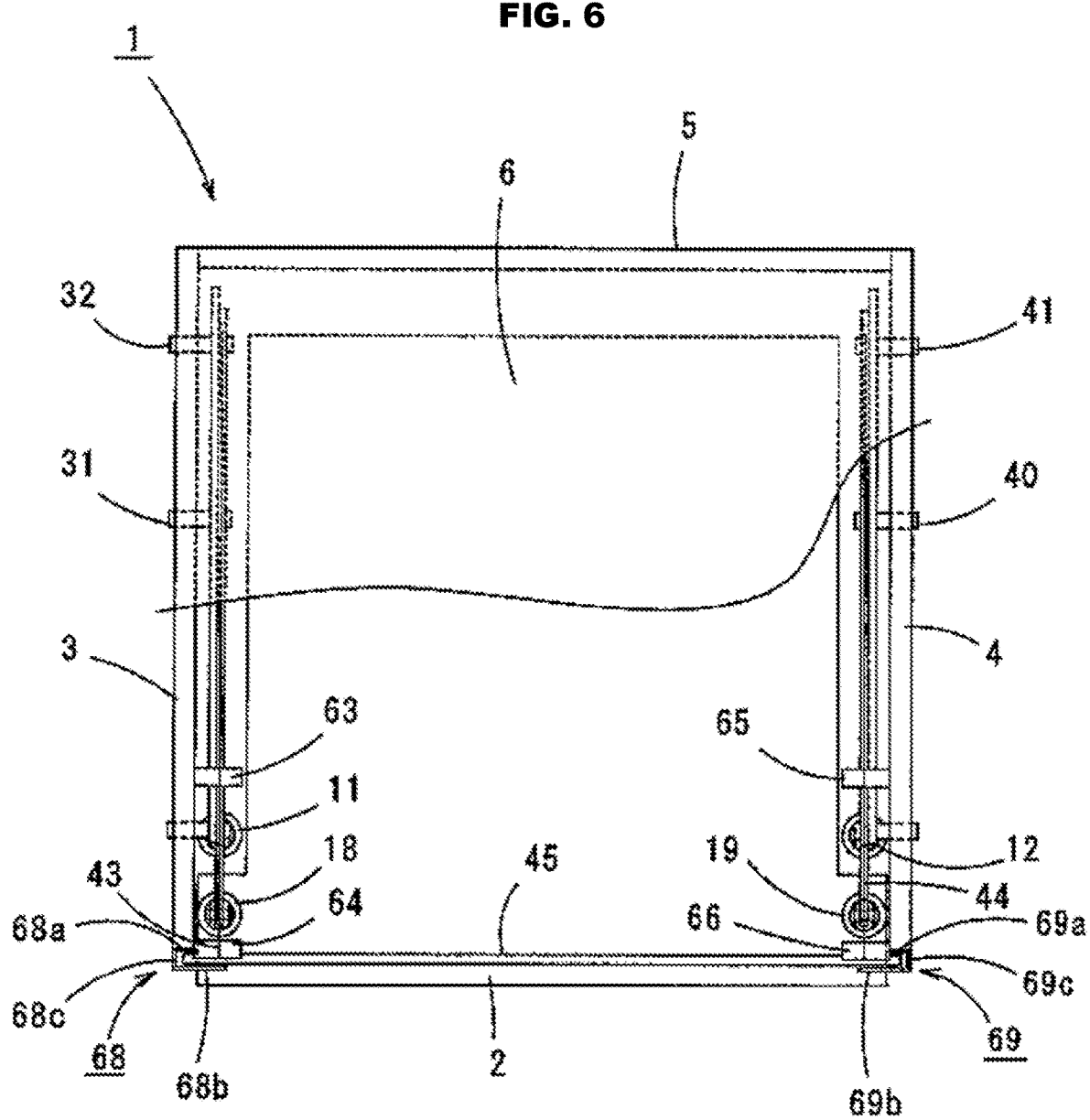
FIG. 6 is a plan view of the article falling prevention device with a part broken away.

Further, as illustrate in FIG. 1 or 6, a left elevating guide member 68 having a U-shaped planar shape is fixed to the front surface of the left side plate 3 and a right elevating guide member 69 having a U-shaped planar shape a U-shape is fixed to the front surface of the right side plate 4. The left elevating guide member 68 and the right elevating guide member 69 include fixing plate portions 68a and 69a fixed to the front of the left side plate 3 or the right side plate 4 respectively, front plate portions 68c and 69c whose back surfaces face the front surfaces of the fixed plate portions 68a and 69a, and outer plate portions 68c and 69c which are flush with the outer side surface of the left side plate 3 or the right side plate 4. The right side of the left elevating guide member 68 is open, and the left side of the right elevating guide member 69 is open. Then, the left end side of the falling prevention member 45 described above is inserted into the left elevating guide member 68, and the right end side of the falling prevention member 45 is inserted into the right elevating guide member 69. Now that the lower ends of the left elevating guide member 68 and the right elevating guide member 69 are positioned near the middle position of the left side plate 3 or the right side plate 5 respectively. Now that the front plate portions 68b and 69b are position holding units according to the present invention.

Hereinafter, the operation and effect of the falling prevention device 1 will be described while explaining the method of using the falling prevention device 1 according to the embodiment described above. In the following description, it will be explained on the premise that an article placed on a pallet into which a fork of a forklift (not illustrated) is inserted is placed with the pallet on the falling prevention device 1, or an article placed on the pallet is lifted and moved by the forklift.

First, in the falling prevention device 1, as illustrated in FIG. 2, 3 or 5, in the state before the pallet on which the article is placed, the falling prevention member 45 is positioned at the uppermost position, the front end (front side end) of the load support member 17 is spaced above the upper surface of the bottom plate 2, and the rear end (back side end) comes into contact with the upper surface of the bottom plate 2 and is inclined slightly as a whole. Further, the front end (front surface side end) of the left rotating rod 15 and the right rotating rod 16 is also spaced upward above the upper surface of the bottom plate 2 and is slightly inclined as a whole. Hereinafter, the state of the falling prevention member 45, the load support member 17, the left rotating rod 15, the right rotating rod 16 and the like illustrated in FIG. 2 or 5 will be referred to as a standby state. Then, in the standby state of the falling prevention device 1, after the pallet P on which the above-described article W is placed is supported by the right and left forks (not illustrated) and is moved into the falling prevention device 1 from between the left side plate 2 and the right side plate 3 and gradually lowered by the drive of a forklift, the load of the pallet P and the article W is gradually supported by the load support member 17, and the load support member 17 moves downward, and the lower surface of the load support member 17 eventually comes into contact with the upper surface of the bottom plate 2. Now that, along with lowering of the load support member 17, the left rotating rod 15 rotates about the left support shaft 13 while being guided by the first left guide groove 51, and the right rotating rod 16 rotates about the right support shaft 14 while being guided by the first right guide groove 56, both in the counterclockwise direction of FIG. 2 or 3 against the elastic force of the left elastic member 47 or the right elastic member 48. Now that, even if the left rotating rod 15 and the right rotating rod 16 rotate, the load support member 17 rotates about the left rotating shaft 21 and the right rotating shaft 22 as described above. Consequently, the lower surface of the load support member 17 comes into contact with the upper surface of the bottom plate 2 (refer to FIG. 4).

Figure 4:
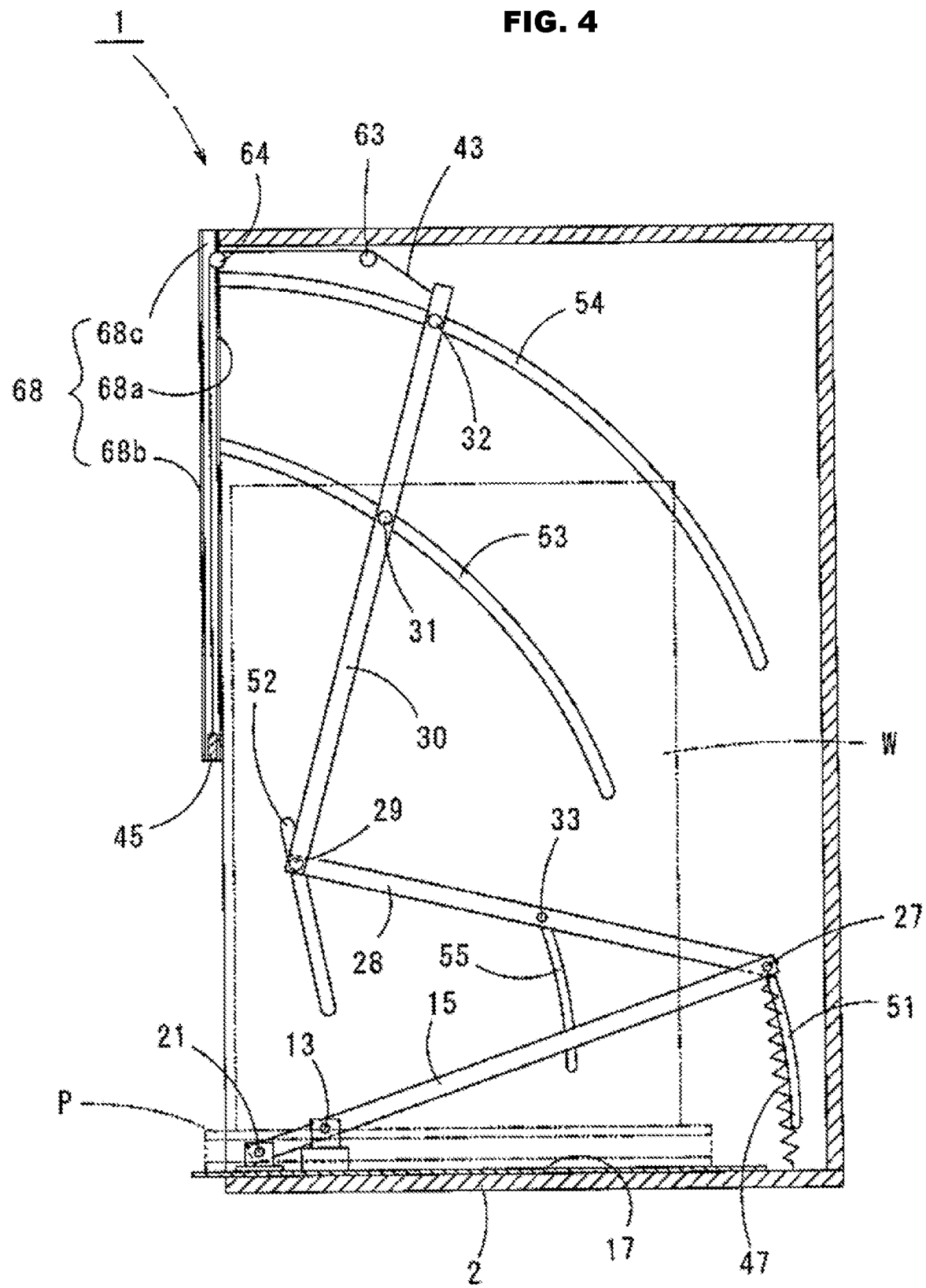
FIG. 4 is a right side cross-sectional view of the article falling prevention device, indicating a state in which a fall prevention material is lowered.
Figure 7:
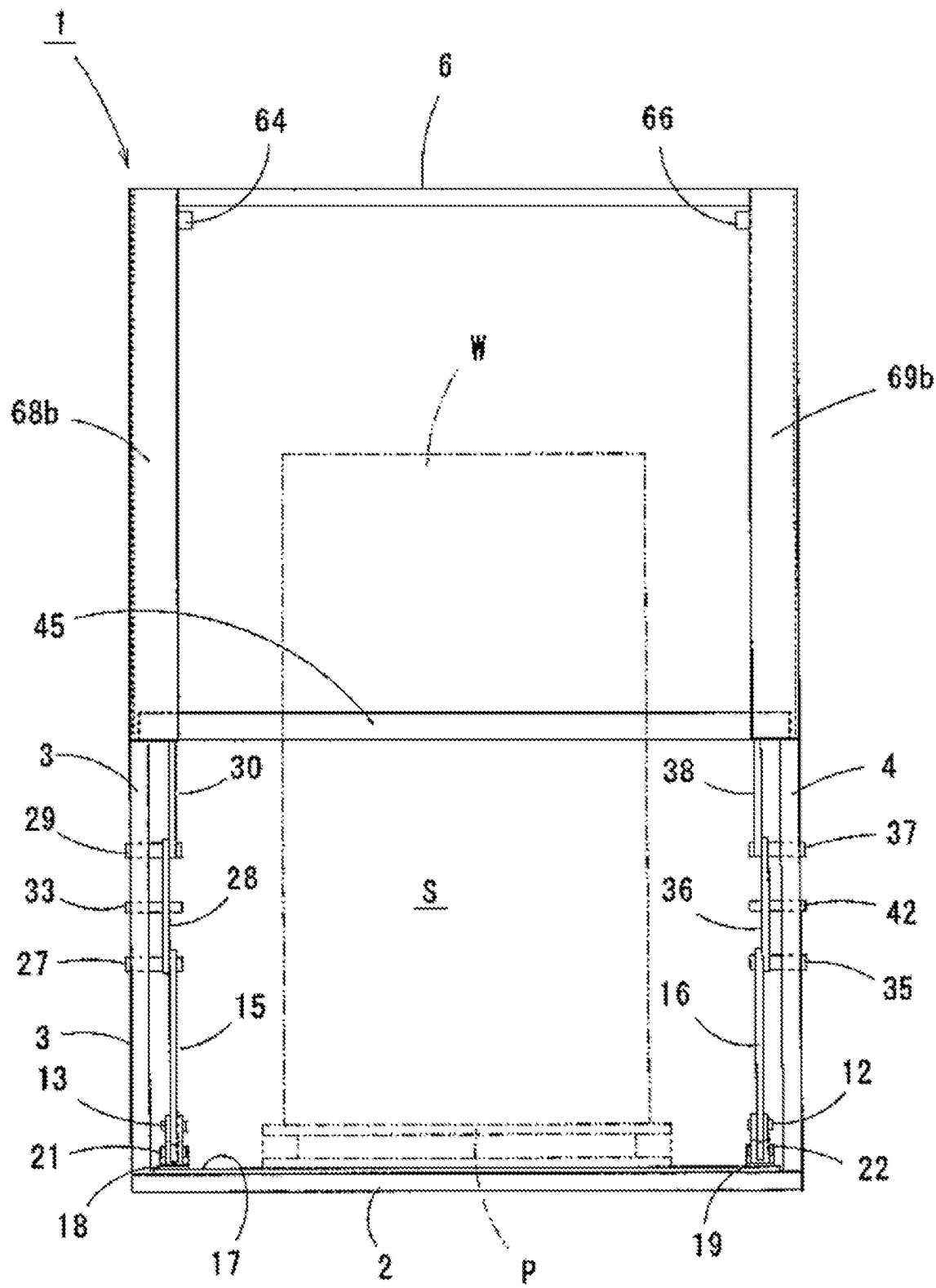
FIG. 7 is a front view of the article falling prevention device, indicating a state in which an article is placed.

In addition, when each of the left rotating rod 15 and the right rotating rod 16 rotates as described above, the first left link member 28 moves while being guided by the second and fifth left guide grooves 52 and 55 while being pulled by the weight of the falling prevention member 45, and also the first right link member 36 moves while being guided by the second and fifth right guide grooves 57 and 60 while being pulled by the weight of the falling prevention member 45. Then, when the first left link member 28 and the first right link member 36 are moved, according to these operations, the second left link member 30 and the second right link member 38 move while being guided by each of the third and fourth left guide grooves 53 and 54 or the third and fourth right guide grooves 58 and 59, and the falling prevention member 45 is lowered from the standby position while being guided by the left elevating guide member 68 and the right elevating guide member 69, Finally, as illustrated in FIG. 4 or 7, the lower end of the left elevating guide member 68 and the right elevating guide member 69 (the position facing the front side of the article) is lowered to the position where the insertion space S where the fork can be inserted is left below (refer to FIG. 7). Now that, when the operation for supporting the pallet P on which the article W is placed by the load support member 17 is end as described above, the forklift is then driven to extract the fork from the pallet P. Then, in this state, when the article W on the pallet P supported by the falling prevention device 1 is inclined to the front side due to the occurrence of an earthquake or the like, it comes into contact with the back surface of the falling prevention member 45, but the front plate portion 68b formed on the left elevating guide member 68 and the front plate portion 69b formed on the right elevating guide member 69 are positioned in front of the right and left ends of the falling prevention member 45, and therefore, the article W is not further inclined and does not fall over and down.

Further, in the case of taking out (removing) the pallet P supported on the load support member 17 and on which the article W is placed, the fork is inserted into the inside of the pallet P from the insertion space S formed below the lowered falling prevention member 45, and the pallet P is moved up (lifted) by driving the forklift. Due to the rise of the pallet P, the load support member 17, the left rotating rod 15, and the right rotating rod 16 return to the standby state by the elastic force of the left elastic member 47 and the right elastic member 48, respectively. Along with these operations, the first and second left link members 28 and 30 and the first and second right link members 38 and 38 also operate in the opposite direction to the above-described rotating operation, by the operation of these members, the falling prevention member 45 also returns to the standby state. Therefore, by driving the forklift, the pallet P on which the above-described article W is placed can be taken out from the inside of the falling prevention device 1 to the outside.

Thus, as the structure of a device for preventing an article from falling over due to vibration such as an earthquake, the article falling prevention device 1 according to the above-described embodiment does not use any electrically driven configuration at all and can always function even if a power failure occurs due to the occurrence of an earthquake or the like. Further, with this falling prevention device 1, the first and second left link members 28 and 30 are interposed between the left rotating rod 15 which rotates in the same manner as a lever and the left linear body 43 connected to the left end side of the falling prevention member 45, and the first and second right link members 38 and 38 are interposed between the right rotating rod 16 and the right linear body 44 connected to the right end side of the falling prevention member 45. The left rotating rod 15 and the right rotating rod 16 rotate about the left support shaft 13 or the right support shaft 14 supported at the front middle portion (front end middle portion) of the left rotating rod 15 and the right rotating rod 16. The distance from the left support shaft 13 or the right support shaft 14 which is a supporting point to the position of the rear end of the left rotating rod 15 or the right rotating rod 16 which is an action point is much longer than the distance from the position of the load support member 17 or the left rotating rod 15 or the front end of the right rotating rod 16 that is a supporting point to the left support shaft 13 or the right support shaft 14 that is the supporting point. Therefore the falling prevention member 45 can be moved up and down over a distance that is considerably longer than the distance by which the load support member 17 is lowered.

Figure 8:
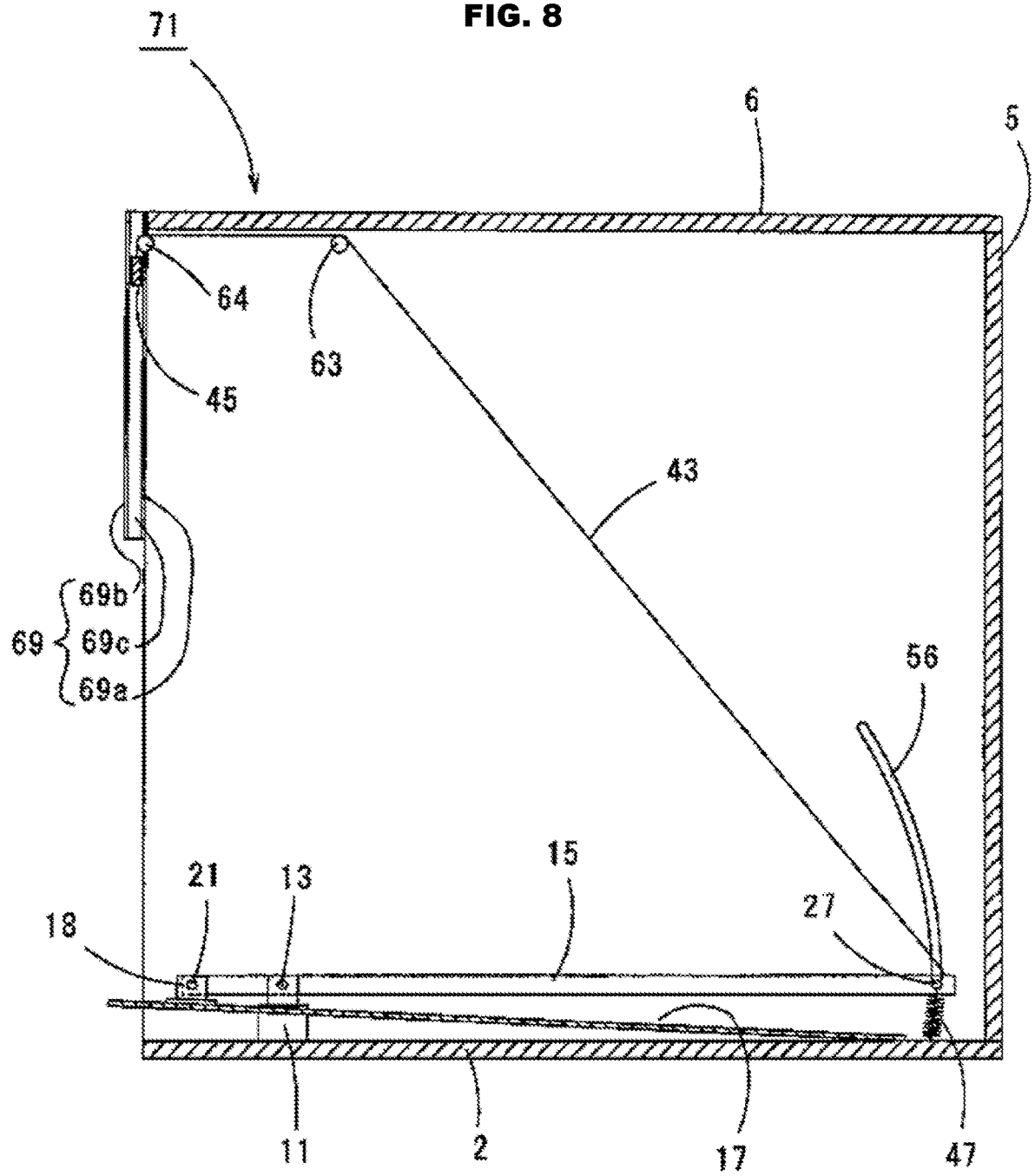
FIG. 8 is a side cross-sectional view illustrating the article falling prevention device according to a second embodiment of the present invention.

Now that, in the falling prevention device 1 according to the above embodiment, the first and second left link members 28 and 30 and the first and second right link members 36 and 38 are components, but the present invention may not use these as components, and as the falling prevention device 71 according to the second embodiment, as schematically illustrated in FIG. 8, the rear end side of the left rotating rod 15 and the left linear body 43 may be directly connected, and also, the right rotating rod 16 and the right linear body 44 may be directly connected (although illustration is omitted). Even with the falling prevention device 71 configured in this way, although a lifting and lowering range of the falling prevention member 45 is shortened as compared with the falling prevention device 1 according to the embodiment described above, and since the load of the article W is supported by the load support member 17, the falling prevention member 45 can be moved up and down over a distance longer than the distance the load support member 17 is lowered.

Now that, in the falling prevention devices 1 and 71 according to the above-described each embodiment, a rod-like body (falling prevention member 45) having a length in the horizontal direction is illustrated and described as the falling prevention member according to the present invention. The falling prevention member according to the above inventions is not limited to a rod-like body, but may be a plate-like body. For example, a rod-like body having a length in the horizontal direction like a ladder may be rotatably connected vertically and bent by moving up such that a part of the upper end side is guided by the second left linear body guide member 64 and the second right linear body guide member 66. Further, in the falling prevention devices 1 and 71 according to the above-described embodiments, the plate body (load support member 17) molded in a rectangular shape is illustrated and described as a load support member according to the present invention. The load support member according to the present invention may be, for example, a rod-like member, a wire or a belt stretched in the horizontal direction, or the like as long as it supports at least all or part of the load of the article.

Next, a falling prevention device 81 according to a third embodiment will be described in detail with reference to the drawings.

Figure 9:
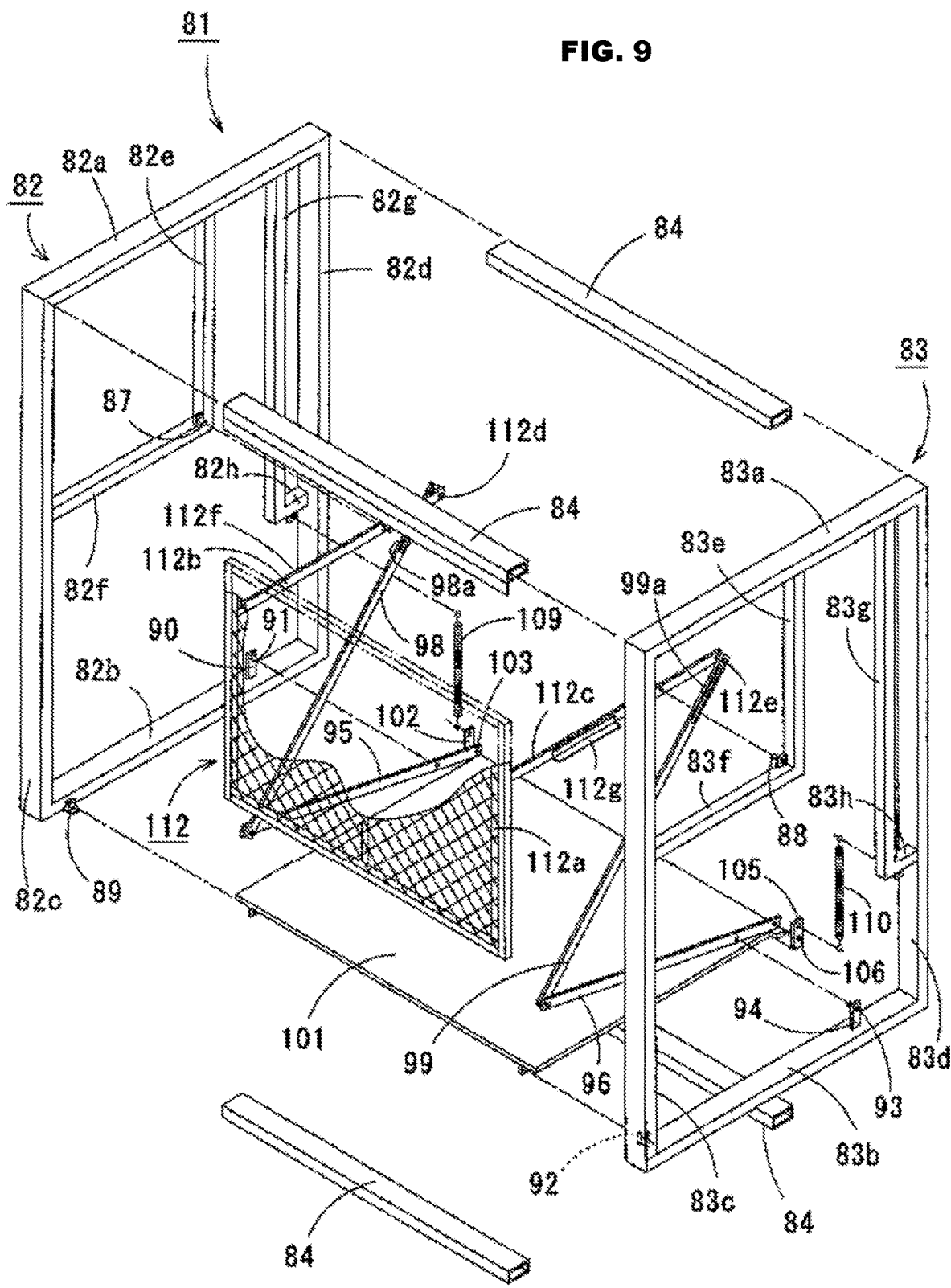
FIG. 9 is an exploded perspective view illustrating the article falling prevention device according to a third embodiment of the present invention.

As illustrated in FIG. 9, the falling prevention device 81 includes a left frame 82 and a right frame 83, which are each molded in a frame shape by a hollow steel frame and are molded in the same shape, and four horizontal weirs 84 connecting the left frame 82 and the right frame 83. The left frame 82 includes an upper left rod 82a and a lower left rod 82b which are molded in the same length and made parallel to each other and the front left rod 82c and the rear left rod 82d which are molded in the same length and made parallel to each other. The right frame 83 includes an upper right rod 83a and a lower right rod 83b, and a front right rod 83c and a rear right rear rod 83d. Then, the first left vertical rod 82e is suspended from slightly behind the center of the lower surface of the upper left rod 82a constituting the left frame 82, and the left parallel rod (left stopper configuring the present invention) 82f whose tip is fixed to the lower end of the first left vertical rod 82e in parallel with the upper left rod 82a is fixed from slightly above the center of the back surface of the front left rod 82c. The left parallel rod (left stopper according to the present invention) 82f is fixed, and a left fixed rotating shaft 87 is erected in the horizontal direction at the fixed position of the first left vertical rod 82e and the left parallel rod 82f. Further, a second left vertical rod 82g parallel to the rear left rod 82d is suspended from the lower surface of the rear end side middle portion of the upper left rod 82a, and the lower end of the second left vertical rod 82g and the front face of the rear left rod 82d is connected by a left connecting rod 82h. Further, on the front end side of the inner side surface of the lower left rod 82b constituting the left frame 82, the other left rotating shaft 89 is provided so as to protrude on the right frame 83 side. In addition, a shaft support column 90 is erected at a rear end side middle portion of the upper surface of the lower left rod 82b, and a left support shaft 91 according to the present invention is provided on the shaft support column 90 so as to protrude toward the right frame 83 side. Now that, the right frame 83 is provided with the first left vertical rod 82e, the left parallel rod 82f, the left fixed rotating shaft 87, the second left vertical rod 82g, the left connecting rod 82h, and the other left rotating shaft 89, the shaft support column 90, the first right vertical rod 83e molded in the same shape as the left support shaft 91, the right parallel rod 83f, the right fixed rotating shaft 88, the second right vertical rod 83g, the right connecting rod 83h, the other right rotating shaft 92 (refer to FIG. 11), the shaft support column 94, and the right support shaft 93. The right parallel rod 83f is a right stopper that constitutes the present invention.

Then, the left rotating rod 95 according to the present invention is rotatably attached to the left support shaft 91. Further, the right rotating rod 96 according to the present invention is rotatably attached to the right support shaft 93. An insertion shaft (reference numeral is omitted) through which the left support shaft 91 is inserted is formed in a rear end side middle portion of the left rotating rod 95, and one end of the left link member 98 is rotatably connected at the front end via a connection shaft (reference numeral is omitted). Further, an insertion shaft (reference numeral is omitted) through which the right support shaft 93 is inserted is formed in a rear end side middle portion of the right rotating rod 96, and one end of the right link member 99 is rotatably connected at the front end via a connection shaft (reference numeral is omitted). Now that long holes 98a and 99a are formed on the other ends of the left link member 98 and the right link member 99, respectively.

Then, the load support member 101 according to the present invention is disposed between the lower left rod 82b of the left frame 82 and the lower right rod 83b of the right frame 83. The load support member 101 is a plate molded in a rectangular shape and supports all of the load of an article as described later. The front of the left end (of the lower surface) of the load support member 101 is rotatably supported by the other left rotating shaft 89, and the front of the right end is rotatably supported by the other right rotating shaft 92 (refer to FIG. 11). Further, a left shaft support piece 102 is erected on the left side of the rear end of the load support member 101 to be rotatably connected to the rear end of the left rotating rod 95 via one left rotating shaft 103 fixed to the upper end side of the left shaft support piece 102. Furthermore, a right shaft support piece 105 is erected on the rear end left side of the load support member 101 to be rotatably connected to the rear end of the right rotating rod 96 via one right rotating shaft 106 fixed to the upper end side of the right shaft support piece 105.

Further, the rear end side of the load support member 101 is energized upward by the left elastic member 109 and the right elastic member 110. One end of the left elastic member 109 is engaged with the left connecting rod 82h, and the lower end is engaged with the left shaft support piece 102. Further, one end of the right elastic member 110 is engaged with the right connecting rod 83h, and the lower end is engaged with the right shaft support piece 105. In the falling prevention device 81 according to the third embodiment, the falling prevention member 112 is a component. As described later, the falling prevention member 112 includes a rectangular falling prevention member main body 112a (refer to FIG. 9 or 13) moving to the front of the article W placed on the load support member 101, a left arm 112b whose base end is fixed to the left end of the back surface of the falling prevention member main body 112a, and a right arm 112c whose base end is fixed to the right end of the back surface of the falling prevention member main body 112a. Then, sliding shafts 112d and 112e inserted into the long holes 98a and 99a formed on the other end side of the left link member 98 or the right link member 99 are fixed on the tip side of the left arm 112b and the right arm 112c. Further, a left contact member 112f and a right contact member 112g are fixed to middle portions of the left arm 112b and the right arm 112c, as described later. The left contact member 112f and the right contact member 112g come into contact with the upper surface of the left parallel rod 92f or the right parallel rod 83f which is a left stopper or a right stopper according to the present invention when the falling prevention member main body 112a is moved to the front of the article W mounted on the load support member 101. Further, an insertion hole (not illustrated) into which the left fixed rotating shaft 87 is inserted is formed in the tip side middle portion of the left arm 112b, and also an insertion hole (not illustrated) into which the right fixed rotating shaft 88 is inserted is formed in the tip side middle portion of the right arm 112c. Therefore, as described later, the falling prevention member 112 is rotated about the left fixed rotating shaft 87 and the right fixed rotating shaft 88.

Figure 10:
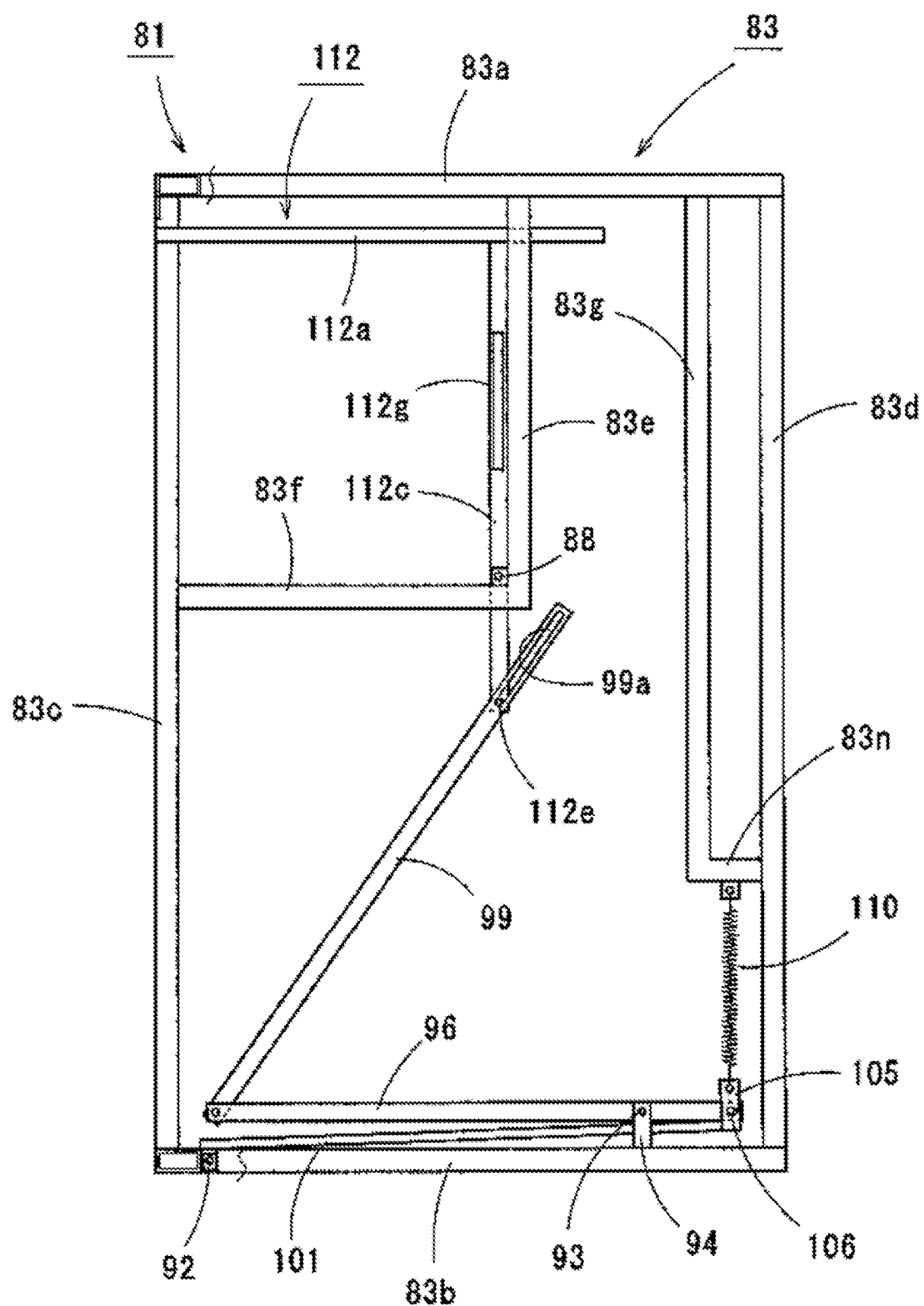
FIG. 10 is a right side cross-sectional view illustrating a state before an article is placed on a load support member.
Figure 11:
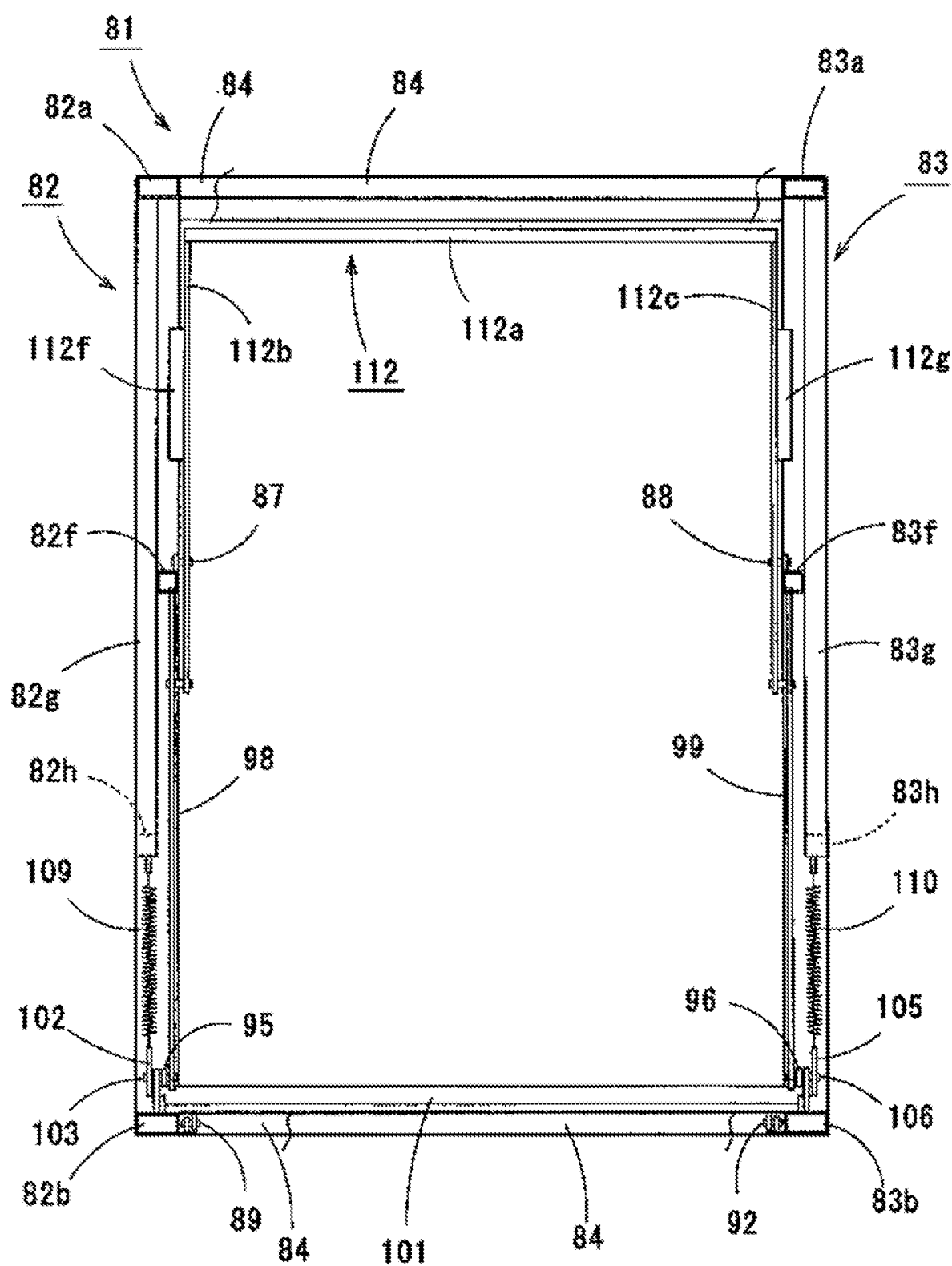
FIG. 11 is a front view illustrating a state before the article is placed on the load support member.

Hereinafter, the operation and effects will be described while explaining the operation of the falling prevention member 81 according to the third embodiment described above. First, in the standby state before the article W is placed on the load support member 101, as illustrated in FIG. 10 or 11, the rear end side of the load support member 101 is slightly moved up (inclined) compared to the front end side. Further, the falling prevention member main body 112a included in the falling prevention member 112 is in a substantially horizontal state on the upper side. Further, the sliding shaft 112d fixed to the left arm 112b is positioned at the lowermost side (one end side) of the long hole 98a formed in the left link member 98. Similarly, the sliding shaft 112e fixed to the right arm 112c is positioned at the lowermost (one end side) of the long hole 99a formed in the right link member 99 (refer to FIG. 10). In this state, the pallet P on which the article W is placed is supported by the right and left forks (not illustrated) and moved into the article housing space formed in the falling prevention device 1 by driving a forklift. After being gradually lowered, the load of the pallet P and the article W is gradually supported by the load support member 101, and the rear end side of the load support member 101 is lowered (rotates) about the other left rotating shaft 89 and the other right rotating shaft 92 against the elastic force of the left elastic member 99 and the right elastic member 110. Then, along with the descent (rotation) operation of the load support member 101, the left rotating rod 95 rotates in the clockwise direction in FIG. 10 about the left support shaft 91, and the right rotating rod 96 rotates in the clockwise direction in FIG. 10 about the right rotating shaft 93. As described above, when the left rotating rod 95 rotates, the left link member 98 moves up while rotating about one end side thereof and pushes up the left arm 112b constituting the falling prevention member 112. Further, when the right rotating rod 96 rotates, the right link member 99 moves up while rotating about one end side thereof and pushes up the right arm 112c included in the falling prevention member 112.

Figure 12:
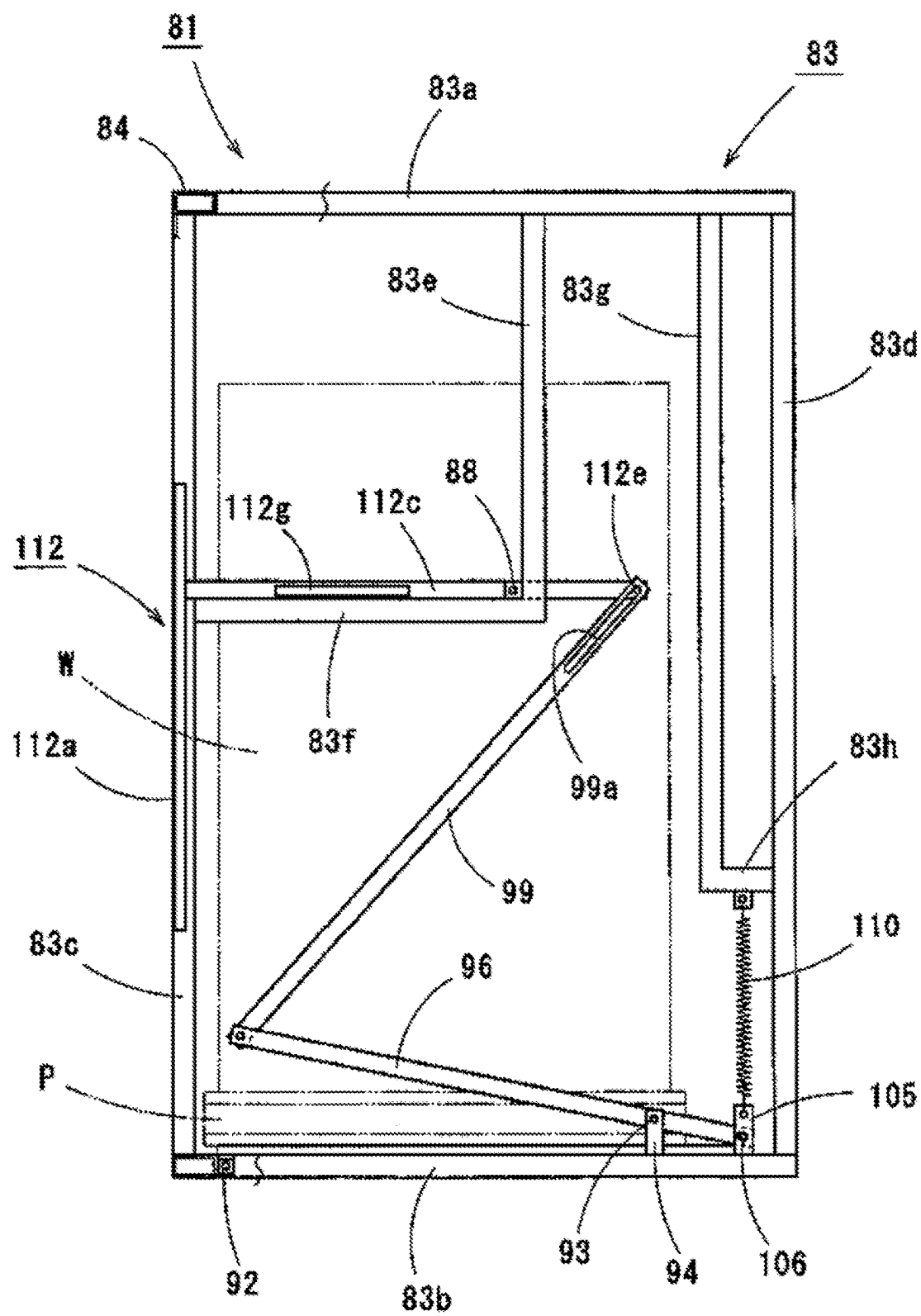
FIG. 12 is a right side cross-sectional view illustrating a state after the article is placed on the load support member from the state illustrated in FIG. 10.
Figure 13:
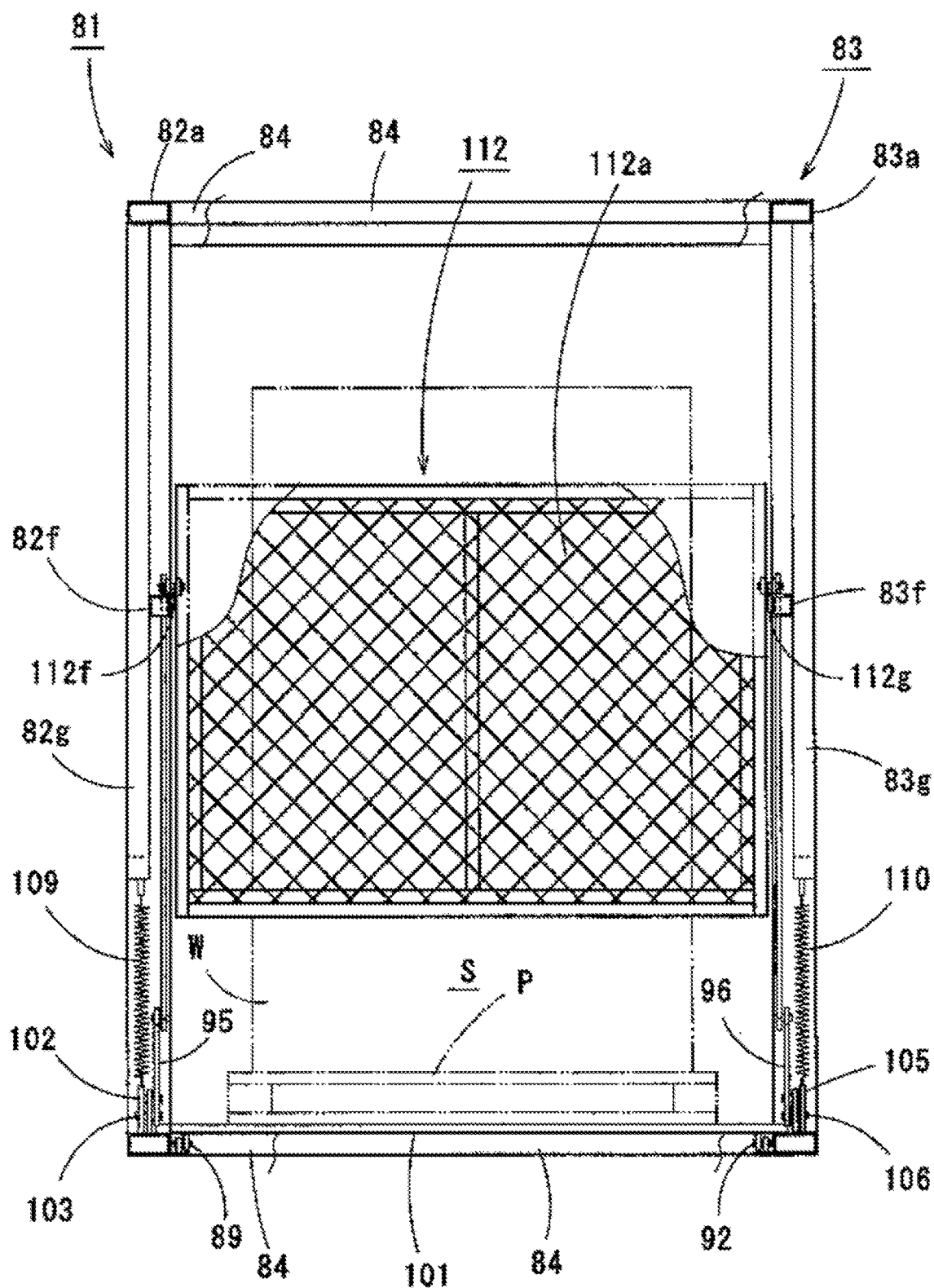
FIG. 13 is a front view illustrating a state after the article is placed on the load support member from the state illustrated in FIG. 11.

Thus, the entire falling prevention member 112 pushed up by the left link member 98 and the right link member 99 rotates in the counterclockwise direction in FIG. 10 about the left fixed rotating shaft 87 and the right fixed rotating shaft 88 and eventually stops at the position indicated in FIG. 12 or 13. This state is the fall prevention state after the article W (and the pallet P) is placed on the load support member 101. In the fall prevention state, the left contact member 112f is in contact with the left parallel rod 82f, and the right contact member 112g is in contact with the rightward moving rod 83f. Further, the sliding shaft 112d fixed to the left arm 112b is positioned at the other end side of the long hole 98a formed in the left link member 98. Similarly, the sliding shaft 112e fixed to the right arm 112c is positioned at the other end side of the long hole 99a formed in the right link member 99 (refer to FIG. 12). Therefore, even if a force acts downward on the falling prevention member 112, since the falling prevention member 112 is not further lowered, and the falling prevention member 112 is supported by the left fixed rotating shaft 87 and the right fixed rotating shaft 88. Therefore, even when the article W comes into contact on the falling prevention member main body 112a due to vibration such as an earthquake, there is no risk of falling any further. Now that, as illustrated in FIG. 13, below the falling prevention member main body 112, an insertion space S is formed in which a fork of a forklift (not illustrated) for lifting the article W from above the load support member 101 is inserted from the front side (refer to FIG. 13).

Therefore, even in the case of the article falling prevention device 81 according to the third embodiment described above, as the structure of a device for preventing an article from falling over due to vibration such as an earthquake, the article falling prevention device 81 does not use any electrically driven configuration at all and can always function even if a power failure occurs due to the occurrence of an earthquake or the like.

REFERENCE SIGNS LIST

1 Article falling prevention device
2 Bottom plate
3 Left side plate
4 Right side plate
13 Left support shaft
14 Right support shaft
15 Left rotating rod
16 Right rotating rod
17 Load support member
21 Left rotating shaft
22 Right rotating shaft
27 First left link side protruding portion
28 First left link member
29 Second left link side protruding portion
30 Second left link member
31 Third left link side protruding portion
32 Fourth left link side protruding portion
33 Fifth left link side protruding portion
35 First right link side protruding portion
36 First right link member
37 Second right link side protruding portion
38 Second right link member
40 Third right link side protruding portion
41 Fourth right link side protruding portion
42 Fifth right link side protruding portion
43 Left linear body
44 Right linear body
45 Falling prevention member
47 Left elastic member
48 Right elastic member
51 to 55 First to fifth left guide grooves
56 to 60 First to fifth right guide grooves
63 First left linear body guide member
64 Second left linear body guide member
65 First right linear body guide member
66 Second right linear body guide member
68b Front plate portion of left elevating guide member
69b Front plate portion of right elevating guide member
81 Article falling prevention device
82 Left frame
82f Left parallel rod
83 Right frame
83f Right parallel rod
89 Another left rotating shaft
91 Left support shaft
92 Another right rotating shaft
93 Right support shaft
95 Left rotating rod
96 Right rotating rod
98 Left link member
99 Right link member
101 Load support member
103 One left rotating shaft
109 Left elastic member
110 Right elastic member
112 Falling prevention member
112a Falling prevention member main body
112b Left arm
112c Right arm
112f Left contact member
112g Right contact member
W Article
P Palette
S Insertion space

The invention claimed is:

1. An article falling prevention device in which an article housing space storing an article inside is formed, and a front side is opened, the article falling prevention device comprising:
a rotating rod having a length in a front-rear direction; a support shaft configured to rotatably support the rotating rod; a load support member on which the article is placed; a falling prevention member that is disposed on the front side and moves in a vertical direction in the article housing space; a connecting member configured to connect the rotating rod and the falling prevention member; and an elastic member configured to energize the rotating rod against a rotating direction about the support shaft,
wherein the rotating rod and the support shaft are provided as a left and right pair,
the load support member and the rotating rod are connected via a rotating shaft at an end of the rotating rod, and
the load support member is rotatable in the same direction as that of the rotating rod.

2. The article falling prevention device according to claim 1, wherein
the article housing space is provided with a bottom plate,
by energizing the rotating rod by the elastic member, a front end or a rear end of the load support member is disposed above the bottom plate when the article is not placed, when the article is placed, the front end or the rear end of the load support member comes into contact with an upper surface of the bottom plate by coming down against an elastic force of the elastic member by a load of the article, and
the falling prevention member is in a standby state in which the falling prevention member waits at a standby position above or diagonally above the load support member before the article is placed on the load support member, and after the article is placed on the load support member, the falling prevention member is lowered by rotation around the support shaft of the rotating rod and rotation of the connecting member by this rotation, and the falling prevention member becomes a fall prevention state by moving from the standby position to a front side of the article.

3. The article falling prevention device according to claim 2, wherein
in the load support member, one end side in a front-rear direction of right and left sides is connected to one end of each of the right and left rotating rods via the rotating shaft,
the elastic member energizes the end side where the load support member and the rotating rod are connected to always be positioned upward, and
when the falling prevention member is in the fall prevention state, an insertion space into which an article lifting unit for lifting the article from above the load support member is inserted from the front side is formed below the falling prevention member.

4. The article falling prevention device according to claim 2, wherein
the connecting member includes at least any one of a linear connecting member made of a linear body, a link connecting member made of a single or a plurality of link members, or a composite connecting member made of the linear body and the plurality of link members.

5. The article falling prevention device according to claim 4, wherein
the article housing space is provided with a left side plate and a right side plate,
the rotating rod has a left rotating rod and a right rotating rod, the support shaft has a left support shaft and a right support shaft,
the falling prevention member is positioned on an upper end side of a front end side of the left side plate and the right side plate in the standby state, the falling prevention member is positioned at a middle portion on the front side of the left side plate and the right side plate and positioned on the front side of the article, in the fall prevention state,
a position holding unit configured to hold a position of the falling prevention member when the article comes in contact with a back surface of the falling prevention member is disposed in front of the left side plate and the right side plate,
a left end of the falling prevention member and the left rotating rod and a right end of the falling prevention member and the right rotating rod are connected by a linear body included in the linear connecting member, and
when the article is placed on the load support member, the left rotating rod rotates about the left support shaft, and the right rotating rod rotates about the right support shaft, and through an operation of the linear connecting member, the falling prevention member is lowered to reach the fall prevention state.

6. The article falling prevention device according to claim 5, wherein
the load support member is molded in a plate shape, and the left end and the right end of the load support member and a front end side or a rear end side of the left rotating rod and the right rotating rod are rotatably connected with each other by the rotating shaft.

7. The article falling prevention device according to claim 5, wherein
a left protruding portion and a right protruding portion protruding in a left side plate direction and a right side plate direction are formed at the rear end or a rear end side middle portion of the left rotating rod and the right rotating rod, a left guide groove and a right guide groove which the left protruding portion and the right protruding portion are inserted and which corresponding to a movement locus along which the left protruding portion and the right protruding portion move are formed in the left side plate and the right side plate, and
the left rotating rod rotates while being guided by the left guide groove, and the right rotating rod rotates while being guided by the right guide groove.

8. The article falling prevention device according to claim 7, wherein
the load support member is molded in a plate shape, and the left end and the right end of the load support member and a front end side or a rear end side of the left rotating rod and the right rotating rod are rotatably connected with each other by the rotating shaft.

9. The article falling prevention device according to claim 4, wherein
the article housing space is provided with a left side plate and a right side plate,
the rotating rod has a left rotating rod and a right rotating rod, the support shaft has a left support shaft and a right support shaft,
the falling prevention member is positioned on an upper end side of a front end side of the left side plate and the right side plate in the standby state, the falling prevention member is positioned at a middle portion on the front side of the left side plate and the right side plate and positioned on the front side of the article, in the fall prevention state,
a position holding unit configured to hold the position of the falling prevention member when the article comes in contact with a back surface of the falling prevention member is disposed in front of the left side plate and the right side plate, the left end of the falling prevention member, the left rotating rod, the right end of the falling prevention member, and the right rotating rod are mutually connected by the composite connecting member, one end of a first left link member and a first right link member included in the composite connecting member is rotatably connected to a rear end of the left rotating rod and the right rotating rod, one end of a second left link member and a second right link member included in the composite connecting member is rotatably connected to the other end of the first left link member and the first right link member, one end of a left linear body and a right linear body included in the composite connecting member and of which a middle portion is guided by a linear body guide member is fixed to the other end of the second left link member and the second right link member, and the other ends of the left linear body and the right linear body are fixed to the left end and the right end of the falling prevention member, and when the article is placed on the load support member, the left rotating rod rotates about the left support shaft, the right rotating rod rotates about the right support shaft, and through an operation of the composite connecting member, the falling prevention member is lowered to reach the fall prevention state.

10. The article falling prevention device according to claim 9, wherein a left link side protruding portion protruding in the left side plate direction and a right link side protruding portion protruding in the right side plate direction are formed at ends and/or middle portions of the first and second left link members and the first and second right link members, a left link side guide groove and a right link side guide groove corresponding to a movement locus along which the left link side protruding portion and the right link side protruding portion move are formed on the left side plate and the right side plate, and the first and second left link members rotate while being guided by the left link side guide groove, and the first and second right link members rotate while being guided by the right link side guide groove.

11. The article falling prevention device according to claim 10, wherein the load support member is molded in a plate shape, and the left end and the right end of the load support member and a front end side or a rear end side of the left rotating rod and the right rotating rod are rotatably connected with each other by the rotating shaft.

12. The article falling prevention device according to claim 9, wherein a left protruding portion and a right protruding portion protruding in a left side plate direction and a right side plate direction are formed at the rear end or a rear end side middle portion of the left rotating rod and the right rotating rod, a left guide groove and a right guide groove which the left protruding portion and the right protruding portion are inserted and which corresponding to a movement locus along which the left protruding portion and the right protruding portion move are formed in the left side plate and the right side plate, and the left rotating rod rotates while being guided by the left guide groove, and the right rotating rod rotates while being guided by the right guide groove.

13. The article falling prevention device according to claim 12, wherein the load support member is molded in a plate shape, and the left end and the right end of the load support member and a front end side or a rear end side of the left rotating rod and the right rotating rod are rotatably connected with each other by the rotating shaft.

14. The article falling prevention device according to claim 9, wherein the load support member is molded in a plate shape, and the left end and the right end of the load support member and a front end side or a rear end side of the left rotating rod and the right rotating rod are rotatably connected with each other by the rotating shaft.

15. The article falling prevention device according to claim 4, wherein the article housing space is surrounded by a left frame and a right frame molded in a square shape, and a plurality of horizontal rods connecting the left frame and the right frame, the load support member is molded in a plate shape, and a front end side or a rear end side of the left end and the right end of the load support member and a front end side or a rear end side of the right and left rotating rods are rotatably connected with each other by the rotating shaft, and the rear end side or front end side of the left end and the right end of the load support member and the left frame and the right frame are rotatably connected by another rotating shaft.

16. The article falling prevention device according to claim 15, wherein the left end and the right end of the falling prevention member and the right and left rotating rods are connected via the link connecting member, and when the article is placed on the load support member, the left and right rotating rods rotate around the left and right support shafts, and the falling prevention member draws an arc from an upper end side of the left frame and the right frame to the front side of the article via an operation of the link connecting member to reach the fall prevention state.

17. The article falling prevention device according to claim 16, wherein the falling prevention member includes:

a plate-like falling prevention member main body positioned in front of the article in the fall prevention state; and a left arm and a right arm of which a front end is fixed to a left side and a right side of a back surface of the falling prevention member main body, and a rear end is extended backward from the falling prevention member main body, the left arm and the right arm being rotatably connected to the link member, a left contact member and a right contact member are fixed to the left arm and the right arm, and to an inside of the left frame and the right frame, a left stopper and a right stopper are fixed, the left stopper and the right stopper having a length in a horizontal direction, and being in contact with the left contact member and the right contact member in the fall prevention state.

* * * * *